United States Patent
Sun et al.

(10) Patent No.: US 12,250,565 B2
(45) Date of Patent: Mar. 11, 2025

(54) CONTROL MESSAGING FOR MULTI-BEAM COMMUNICATIONS

(71) Applicant: Apple Inc., Cupertino, CA (US)

(72) Inventors: Haitong Sun, Cupertino, CA (US); Dawei Zhang, Saratoga, CA (US); Fangli Xu, Beijing (CN); Haijing Hu, Los Gatos, CA (US); Jie Cui, San Jose, CA (US); Wei Zeng, Saratoga, CA (US); Yang Tang, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 36 days.

(21) Appl. No.: 17/440,611

(22) PCT Filed: Apr. 8, 2020

(86) PCT No.: PCT/CN2020/083759
§ 371 (c)(1),
(2) Date: Sep. 17, 2021

(87) PCT Pub. No.: WO2021/203296
PCT Pub. Date: Oct. 14, 2021

(65) Prior Publication Data
US 2023/0027281 A1    Jan. 26, 2023

(51) Int. Cl.
*H04W 16/28*    (2009.01)
*H04L 5/00*    (2006.01)
*H04W 80/02*    (2009.01)

(52) U.S. Cl.
CPC ........... *H04W 16/28* (2013.01); *H04L 5/0051* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2018/0020382 A1* | 1/2018 | Kim | H04W 74/0833 |
| 2021/0105780 A1* | 4/2021 | Jin | H04W 72/1273 |
| 2022/0225370 A1* | 7/2022 | Park | H04L 5/001 |

FOREIGN PATENT DOCUMENTS

| | | |
|---|---|---|
| CN | 102098148 A | 6/2011 |
| CN | 110785958 A | 2/2020 |
| WO | WO-2019-164302 A1 | 8/2019 |

OTHER PUBLICATIONS

Communication pursuant to Rule 164(1) EPC directed to related European Application No. 20929879.3, mailed Dec. 8, 2023; 16 pages.

(Continued)

*Primary Examiner* — Alex Skripnikov
(74) *Attorney, Agent, or Firm* — Sterne, Kessler, Goldstein & Fox P.L.L.C.

(57) ABSTRACT

Some aspects include an apparatus, method, and computer program product for facilitating control messaging for multi-beam communications in 5G wireless communication systems. Nodes of a 5G network may be generate Medium Access Control Control Elements (MAC CEs) to update User Equipment (UE) with different Component Carrier (CC) settings. The MAC CEs may update a list of CCs to reduce messaging overhead and latency. For example, a MAC CE may indicate an update for a Transmission Configuration Indication (TCI) state for a list of CCs. Similarly, a MAC CE may be used to update a spatial relation for a Sounding Reference Signal (SRS) resource set and/or a SRS resource corresponding to a list of CCs. A MAC CE may also be used to update multiple TCI codepoints having one or two TCI states in a multi-Transmission Reception Point (multi-TRP) scenario.

19 Claims, 14 Drawing Sheets

(56) References Cited

OTHER PUBLICATIONS

Oppo: "Report of [108#68][NR eMIMO] Design of DL MAC CEs", 3GPP Draft; R2-2000660, vol. RAN WG2, no. electronic; Feb. 24, 2020-Mar. 6, 2020 Feb. 14, 2020 (Feb. 14, 2020), XP052355831, Retrieved from the Internet: URL:https://ftp.3gpp.org/tsg_ran/WG2_RL2/TSGR2_ 109_e/Docs/ R2-2000660.zip R2-2000660—Report of [108#68][NR eMIMO] Design of DL MAC CEs.docx [retrieved on Feb. 14, 2020].
Samsung: "Introduction of eMIMO for NR", 3GPP Draft; R2-2001897, vol. RAN WG2, no. electronic; Feb. 24, 2020-Mar. 6, 2020 Mar. 12, 2020 (Mar. 12, 2020), XP052356960, Retrieved from the Internet: URL:https://ftp.3gpp.org/tsg_ran/WG2_RL2/TSGR2_109_e/Docs/R2-2001897.zipR2-2001897.docx [retrieved on Mar. 12, 2020].
Oppo: "MAC CE design for eMIMO", 3GPP Draft; R2-1915158, vol. RAN WG2, no. Reno, USA; Nov. 18, 2019-Nov. 22, 2019 Nov. 8, 2019 (Nov. 8, 2019), XP051817056, Retrieved from the Internet: URL:https://ftp.3gpp.org/tsg_ran/WG2_RL2/TSGR2_108/Docs/R2-1915158.zip R2-1915158-MAC CE design for eMIMO.doc [retrieved on Nov. 8, 2019].
Apple Inc., "Remaining Issues on Multi-beam operation," R1-1912824, Nov. 9, 2019; 15 pages.
Qualcomm Incorporated, "Enhanced TCI States Activation/Deactivation PDSCH MAC CE for Multi-TRP," R2-1916066, Revision of R2-1913407, Nov. 8, 2019; 3 pages.
Vivo, "MAC CEs regarding multiple CCs or BWPs", R2-2000385, Feb. 14, 2020; 8 pages.
Oppo, "CC list-based SRS Activation/Deactivation MAC CE design," R2-2000659, Feb. 14, 2020; 5 pages.
Ericsson, "Remaining update for PDSCH TCI state MAC CE," R2-2001126, Feb. 13, 2020; 5 pages.
Huawei, HiSilicon, "MAC CE signalling for multi-beam enhancement," R2-2001196, Feb. 13, 2020; 3 pages.
Oppo, "[AT109e][121][EMIMO] DL MAC CE design (Oppo)," R2-2001686, Mar. 11, 2020; 14 pages.
Notification of Transmittal of the International Search Report and the Written Opinion of the International Searching Authority, for PCT Appl. No. PCT/CN2020/083759, 9 pages, dated Dec. 31, 2020.
Mediatek Inc., "Delay-tolerant re-transmission mechanisms in NR-NTN," 3GPP TSG RAN WG1 Meeting #99, R1-1912125, Reno, Nevada, US, Nov. 18-22, 2019, 8 pages.
Qualcomm Incorporated, "Beam management for NR," 3GPP TSG-RAN WG1 Meeting 93, R1-1807341, Busan, Korea, May 21-25, 2018, 11 pages.
Interdigital, Inc., "Remaining issues on beam management," 3GPP TSG RAN WG1 Meeting #92, R1-1802620, Athens, Greexe, Feb. 26-Mar. 2, 2018, 6 pages.

\* cited by examiner

CONTROL MESSAGING FOR MULTI-BEAM COMMUNICATIONS

CROSS REFERENCE TO RELATED PATENT APPLICATIONS

This application is a U.S. National Phase of International Application No. PCT/CN2020/083759, filed Apr. 8, 2020, which is hereby incorporated by reference in its entirety.

BACKGROUND

Various aspects generally may relate to the field of wireless communications.

SUMMARY

Some aspects of this disclosure include apparatuses and methods for facilitating control messaging for multi-beam communications.

In some aspects, a method for updating Transmission Configuration Indication (TCI) states for a plurality of Component Carriers (CCs) may include identifying an update of a TCI state corresponding to a CC for a User Equipment (UE), wherein the CC has a serving cell ID. The method may include determining that a list of CCs including the CC are to be updated based on the update of the TCI state and generating a medium access control control element (MAC CE) including the serving cell ID and a bit value directing the UE to update a TCI state for CCs in the list of CCs using the serving cell ID. The method may include transmitting the MAC CE to the UE. In some aspects, the method for updating TCI states for a plurality of CCs may be implemented using a wireless communication system and/or a network access node including a transceiver and at least one processor coupled to the transceiver. The at least one processor may be configured to perform the elements of the method. The transceiver may communicate with the UE. In some aspects, a non-transitory computer-readable device may store instructions that, when executed by at least one computing device, cause the at least one computing device to perform the elements of the method.

In some aspects, the method may further include transmitting a Radio Resource Control (RRC) message to the UE to configure the list of CCs.

In some aspects, the method may further include the bit value being indicated using a reserved bit of the MAC CE.

In some aspects, the method may further include the MAC CE including TCI state information to update a TCI state for a Physical Downlink Shared Channel (PDSCH).

In some aspects, the method may further include CORE-SET information to update a TCI state for a Physical Downlink Control Channel (PDCCH).

In some aspects, the method may further include the bit value being the most significant bit (MSB) or the least significant bit (LSB) of a TCI State ID.

In some aspects, the method may further include the bit value modifying a TCI codepoint with multiple TCI states.

In some aspects, a method for updating a spatial relation for a Sounding Reference Signal (SRS) for a plurality of Component Carriers (CCs) may include identifying an update of a spatial relation for a SRS resource set corresponding to a CC. The method may include determining that a periodicity of the SRS resource set is aperiodic or periodic. The method may include generating a medium access control control element (MAC CE) a bit value in an activate/deactivate bit field directing a user equipment (UE) to update a spatial relation for CCs of a list of CCs including the CC. The method may include transmitting the MAC CE to the UE. In some aspects, the method for updating the spatial relation for a SRS for a plurality of CCs may be implemented using a wireless communication system and/or a network access node including a transceiver and at least one processor coupled to the transceiver. The at least one processor may be configured to perform the elements of the method. The transceiver may communicate with the UE. In some aspects, a non-transitory computer-readable device may store instructions that, when executed by at least one computing device, cause the at least one computing device to perform the elements of the method.

In some aspects, the method may further include resources of the SRS resource set having the same time domain pattern.

In some aspects, the method may further include identifying a second update of the spatial relation for the SRS resource set corresponding to the CC. The method may further include determining that a time domain pattern of the SRS resource set corresponding to the second update is semi-persistent. The method may further include generating a second MAC CE including a bit value in a reserved bit field directing the UE to update the spatial relation for the CC according to the second update and transmitting the second MAC CE to the UE.

In some aspects, the bit value in the reserved bit field directs the UE to update the spatial relation for CCs of a list of CCs including the CC.

In some aspects, the method may further include identifying a second update a spatial relation for a SRS resource corresponding to the CC, wherein the CC has a SRS Resource Cell ID. The method may further include determining that a list of CCs including the CC are to be updated based on the update of the spatial relation. The method may further include generating a second MAC CE including the SRS Resource Cell ID and a bit value directing the UE to update a spatial relation for CCs in the list of CCs using the SRS Resource Cell ID and transmitting the second MAC CE to the UE.

In some aspects, the method may further include the second MAC CE having a length of four octets.

In some aspects, a method for configuring a Transmission Configuration Indication (TCI) codepoint for a physical downlink shared channel (PDSCH) may include identifying a configuration of one or more TCI codepoints corresponding to a Component Carrier (CC) of a User Equipment (UE). The method may further include determining that at least one of the one or more TCI codepoints has multiple TCI states. The method may further include generating a medium access control control element (MAC CE) including a first value indicating an amount of the one or more TCI codepoints and a second value indicating an amount of the at least one of the one or more TCI codepoints having multiple TCI states. For at least one of the one or more TCI codepoints having multiple TCI states, the method may further include updating the MAC CE to include a bit indicating the presence of multiple TCI states. The method may further include transmitting the MAC CE to the UE. In some aspects, the method for configuring the TCI codepoint for the PDSCH may be implemented using a wireless communication system and/or a network access node including a transceiver and at least one processor coupled to the transceiver. The at least one processor may be configured to perform the elements of the method. The transceiver may communicate with the UE. In some aspects, a non-transitory computer-readable device may store instructions that, when executed by at least one computing device, cause the at least one computing device to perform the elements of the method.

In some aspects, the method may further include the MAC CE including a first octet of data including the bit indicating the presence of multiple TCI states and a first TCI state ID and a second octet of data including a second TCI state ID.

In some aspects, the method may further include the second octet of data including a reserved bit.

In some aspects, the method may further include the bit indicating to the UE that 8 bits of data following a first TCI state relate to a second TCI state.

In some aspects, the method may further include updating the MAC CE to include a second bit indicating the present of a single TCI state for a TCI codepoint of the one or more TCI codepoints.

In some aspects, the method may further include the second bit indicating to the UE that the following 7 bits of data relate to the single TCI state.

In some aspects, the method may further include the following 7 bits of data include a TCI state ID corresponding to the TCI codepoint.

In some aspects, a method for updating Transmission Configuration Indication (TCI) states at a User Equipment (UE) for a plurality of Component Carriers (CCs) may include receiving, from a wireless access node, a Radio Resource Control (RRC) message directing the UE to configure a list of Component Carriers (CCs). The method may include receiving, from the wireless access node, a medium access control control element (MAC CE) that includes a serving cell ID corresponding to a Component Carrier (CC) in the list and a bit value directing the UE to update a Transmission Configuration Indicator (TCI) state for the list of CCs. In response to identifying the bit value, the method may include identifying the list of CCs using the serving cell ID and updating the TCI state for the CCs in the list of CCs.

In some aspects, the method for updating TCI states for a plurality of CCs may be implemented using a UE including a transceiver and at least one processor coupled to the transceiver. The at least one processor may be configured to perform the elements of the method. The transceiver may communicate with the wireless access node. In some aspects, a non-transitory computer-readable device may store instructions that, when executed by at least one computing device, cause the at least one computing device to perform the elements of the method.

In some aspects, the method may further include the bit value being indicated using a reserved bit of the MAC CE.

In some aspects, the method may further include the MAC CE including TCI state information to update a TCI state for a Physical Downlink Shared Channel (PDSCH).

In some aspects, the method may further include CORESET information to update a TCI state for a Physical Downlink Control Channel (PDCCH).

In some aspects, the method may further include the bit value being the most significant bit (MSB) or the least significant bit (LSB) of a TCI State ID.

In some aspects, the method may further include the bit value modifying a TCI codepoint with multiple TCI states.

BRIEF DESCRIPTION OF THE DRAWINGS/FIGURES

Figure 1:
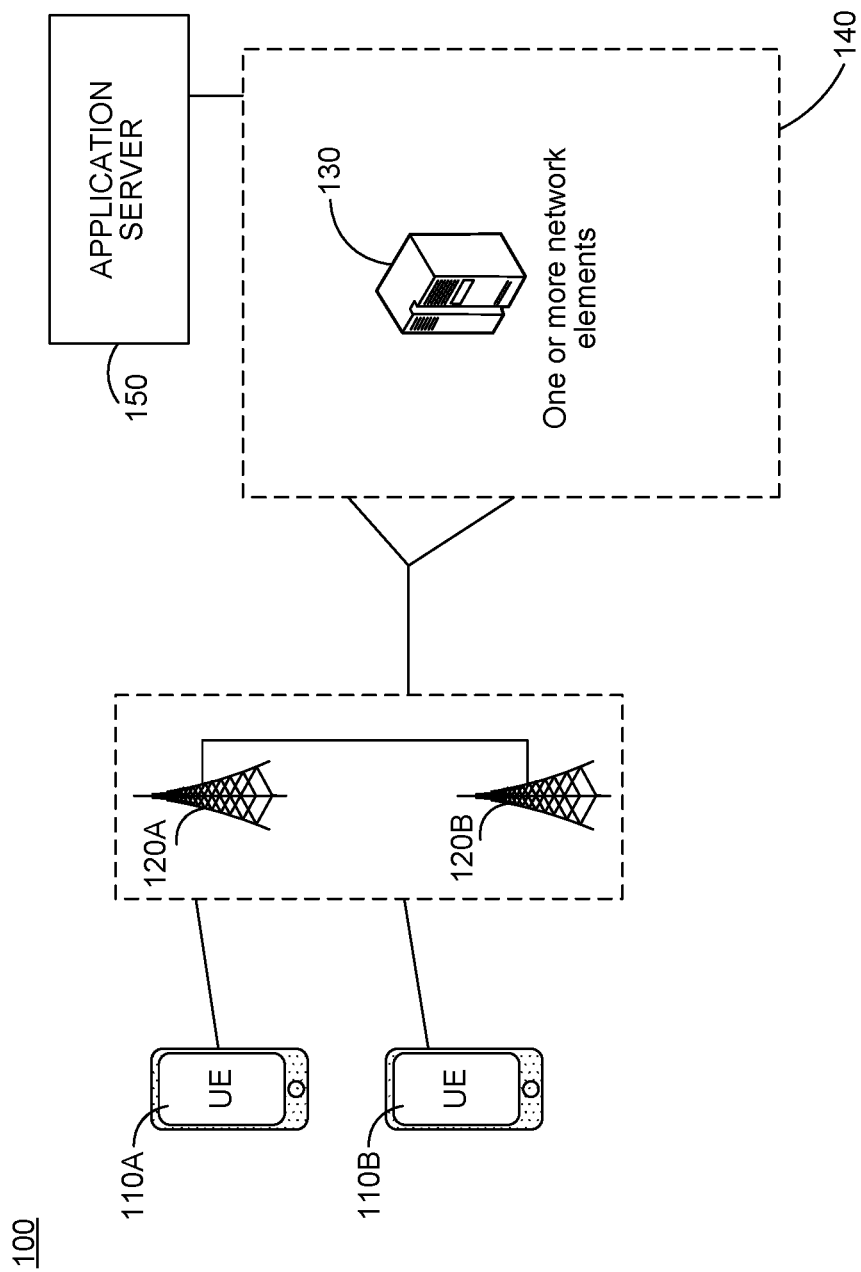
FIG. 1 illustrates an example system implementing control messaging for multi-beam communications, according to some aspects.

The features and advantages of the aspects will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

This disclosure relates communications between nodes and user equipment (UE) using the 5G wireless communications protocol. The nodes may be, for example, gNB or ng-eNB nodes. As part of the development of the 5G standard, 3rd Generation Partnership Project (3GPP) has released several documents detailing the meetings notes and developments. One such document is known as Release 16 (Rel-16).

Rel-16 provides some descriptions for multi-beam and multiple-input and multiple-output (MIMO) communications between nodes and UEs. These communications may use multiple transmission and receiving antennas to exploit multipath propagation. One concept for describing the relationship for these multiple beam communication is "quasi co-location" or QCL. QCL refers to a detected relationship between multiple signals received from a transmitted antenna array. In particular, two antenna ports may be quasi co-located if properties of the channel over which a symbol on one antenna port is conveyed can be inferred from the channel over which a symbol on the other antenna port is conveyed.

To provide an example of this QCL, an example will be described illustrating that a signal A is quasi co-located with another signal B. For example, a node may transmit signal A and signal B to a UE using an antenna array or a common transmission/reception point (TRP) from the node. These signals may be reference signals. The same spatial filter may have been applied to the signals. The signals may also travel through similar channel conditions and experience similar channel properties as they travel to the UE from the node. Because signal A and signal B experience similar channel properties, when received at the UE, the UE may detect the channel properties experienced by signal A and then detect signal B. Channel properties may include, for example, Doppler shift, Doppler spread, average delay, delay spread, and/or other channel effects. In view of these issues, if the UE can detect one of the signals and determine the channel properties, this information may aid in detecting the other signal. When the UE is able to perform this detection, signal A and signal B are referred to as being quasi co-located (QCL).

To aid the UE in identifying QCL signals, Transmission Configuration Indicator (TCI) state information may be transmitted from the node to the UE. The TCI states include information such as the QCL relationships between different reference signals and/or downlink reference signals. For example, the TCI states may be transmitted in a Downlink Control Information (DCI) message which describes QCL relationships for sets of channel state information reference signals (CSI-RS) and/or Demodulation Reference Signals (DMRS). The TCI state information may include parameters for a UE to configure QCL relationships between downlink reference signals for a Physical Downlink Shared Channel (PDSCH) and/or a Physical Downlink Control Channel (PDCCH).

While this TCI state information may aid in providing more reliable communications between nodes and UEs, some issues arise when providing this information to the UE. For example, TCI states may change and a node may need to update the TCI state information at a UE. Similarly, a UE may need to initially update TCI state information when communicating with a node. The changes to the TCI state information may apply to many different signals or reference signals and/or a number of different frequency blocks or component carriers (CCs). This updating is further complicated in situations with multiple transmission/reception points (TRPs) or where multiple nodes are communicating with a particular UE. This situation may introduce overhead and latency issues from a node sending many messages to a UE to update TCI states and/or spatial relations for different reference signals and CCs.

In view of these issues, the aspects described herein reduce the amount of control messaging used to update TCI states to reduce messaging overhead and latency. In particular, the aspects describe using Medium Access Control Control Elements (MAC CEs) to update TCI states for a list of CCs. This updating may also apply to multi-TRP scenarios. The MAC CEs also allow for updating spatial relation information for Sounding Reference Signals (SRS) resources and/or different SRS resources sets having different periodicity and/or time domain patterns. Further, MAC CEs may be used to configure TCI codepoints which have multiple TCI states. Using these MAC CE designs, an amount of messages and/or MAC CEs may be reduced to provide more efficient TCI state updating and/or to reduce latency.

Various aspects of these features will now be discussed with respect to the corresponding figures.

FIG. 1 illustrates an example system 100 implementing control messaging for multi-beam communications, according to some aspects. FIG. 1 illustrates an example system architecture 100 of a network, in accordance with various aspects. The following description is provided for an example system 100 that operates in conjunction with the LTE system standards and 5G or NR system standards as provided by 3GPP technical specifications. However, the example aspects are not limited in this regard and the described aspects may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 110A and UE 110B (collectively referred to as "UEs 110" or "UE 110"). In this example, UEs 110 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 110 may be configured to connect, for example, communicatively coupled, with a Radio Access Network (RAN) including RAN nodes 120A, 120B. In aspects, the RAN may be an NG RAN or a 5G RAN, an E-UTRAN, or a legacy RAN, such as a UTRAN or GERAN. As used herein, the term "NG RAN" or "next-generation RAN" or the like may refer to a RAN that operates in an NR or 5G system 100, and the term "E-UTRAN" or the like may refer to a RAN that operates in an LTE or 4G system 100. The UEs 110 utilize connections (or channels), respectively, each of which comprises a physical communications interface or layer (discussed in further detail below). In some aspects, a UE 110 may communicate with one or more RAN nodes 120.

In this example, the connections are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In aspects, the UEs 110 may directly exchange communication data via a ProSe interface. The ProSe interface may alternatively be referred to as a SL interface and may comprise one or more logical channels, including but not limited to a PSCCH, a PSSCH, a PSDCH, and a PSBCH.

The UE 110A may be configured to access an access point (AP) (also referred to as "WLAN node," "WLAN," "WLAN Termination," "WT" or the like). The connection can comprise a local wireless connection, such as a connection consistent with any IEEE 802.11 protocol, wherein the AP would comprise a wireless fidelity (Wi-Fi®) router. In this example, the AP is shown to be connected to the Internet without connecting to the core network of the wireless system (described in further detail below). In various aspects, the UE 110A, RAN, and AP may be configured to utilize LWA operation and/or LWIP operation. The LWA operation may involve the UE 110A in RRC_CONNECTED being configured by a RAN node 120A, 120B to utilize radio resources of LTE and WLAN. LWIP operation may involve the UE 110A using WLAN radio resources via IPsec protocol tunneling to authenticate and encrypt packets (e.g., IP packets) sent over the connection. IPsec tunneling may include encapsulating the entirety of original IP packets and adding a new packet header, thereby protecting the original header of the IP packets.

The RAN can include one or more AN nodes or RAN nodes 120A and 120B (collectively referred to as "RAN nodes 120" or "RAN node 120"). As used herein, the terms "access node," "access point," "AN", "RAN node", or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 120 that operates in an NR or 5G system 100 (for example, a gNB), and the term "E-UTRAN node" or the like may refer to a RAN node 120 that operates in an LTE or 4G system 100 (e.g., an eNB). According to various aspects, the RAN nodes 120 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some aspects, all or parts of the RAN nodes 120 may be implemented as one or more software entities running on server computers as part of a virtual network, which may be referred to as a CRAN and/or a virtual baseband unit pool (vBBUP). In these aspects, the CRAN or vBBUP may implement a RAN function split, such as a PDCP split wherein RRC and PDCP layers are operated by the CRAN/vBBUP and other L2 protocol entities are operated by individual RAN nodes 120; a MAC/PHY split wherein RRC, PDCP, RLC, and MAC layers are operated by the CRAN/vBBUP and the PHY layer is operated by individual RAN nodes 120; or a "lower PHY" split wherein RRC, PDCP, RLC, MAC layers and upper portions of the PHY layer are operated by the CRAN/vBBUP and lower portions of the PHY layer are operated by individual RAN nodes 120. This virtualized framework allows the freed-up processor cores of the RAN nodes 120 to perform other virtualized applications. In some implementations, an individual RAN node 120 may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the RAN (not shown) or by a server pool in a similar manner as the CRAN/vBBUP. Additionally or alternatively, one or more of the RAN nodes 120 may be next generation eNBs (ng-eNBs), which are RAN nodes that provide E-UTRA user plane and control plane protocol terminations toward the UEs 110, and are connected to a 5GC via an NG interface (discussed infra).

In V2X scenarios one or more of the RAN nodes 120 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 110 (vUEs 110). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 120 can terminate the air interface protocol and can be the first point of contact for the UEs 110. In some aspects, any of the RAN nodes 120 can fulfill various logical functions for the RAN including, but not limited to, radio network controller (RNC) functions such as radio bearer management, uplink and downlink dynamic radio resource management and data packet scheduling, and mobility management.

In aspects, the UEs 110 can be configured to communicate using OFDM communication signals with each other or with any of the RAN nodes 120 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 120 to the UEs 110, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various aspects, the UEs 110 and the RAN nodes 120 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 110 and the RAN nodes 120 may operate using LAA, eLAA, and/or feLAA mechanisms. In these implementations, the UEs 110 and the RAN nodes 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 110, RAN nodes 120, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 110, AP, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 110. The PDCCH carries information about the transport format and resource allocations related to the PDSCH channel, among other things. It may also inform the UEs 110 about the transport format, resource allocation, and HARQ information related to the uplink shared channel. Typically, downlink scheduling (assigning control and shared channel resource blocks to the UE 110A within a cell) may be performed at any of the RAN nodes 120 based on channel quality information fed back from any of the UEs 110. The downlink resource assignment information may be sent on the PDCCH used for (e.g., assigned to) each of the UEs 110.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 120 may be configured to communicate with one another via an interface. In aspects where the system 100 is an LTE system (e.g., when core network (CN) 140 is an EPC), the interface may be an X2 interface. The X2 interface may be defined between two or more RAN nodes 120 (e.g., two or more eNBs and the like) that connect to EPC, and/or between two eNBs connecting to EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In aspects where the system 100 is a 5G or NR system (e.g., when CN 140 is an 5GC), the interface may be an Xn interface. The Xn interface is defined between two or more RAN nodes 120 (e.g., two or more gNBs and the like) that connect to 5GC, between a RAN node 120 (e.g., a gNB) connecting to 5GC and an eNB, and/or between two eNBs connecting to 5GC. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 110 in a connected mode (e.g., CM-CONNECTED) including functionality to manage the UE mobility for connected mode between one or more RAN nodes 120. The mobility support may include context transfer from an old (source) serving RAN node 120 to new (target) serving RAN node 120; and control of user plane tunnels between old (source) serving RAN node 120 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN is shown to be communicatively coupled to a core network—in this aspect, core network (CN) 120. The CN 140 may comprise a plurality of network elements 130, which are configured to offer various data and telecommunications services to customers/subscribers (e.g., users of UEs 110) who are connected to the CN 140 via the RAN. The components of the CN 140 may be implemented in one physical node or separate physical nodes including components to read and execute instructions from a machine-readable or computer-readable medium (e.g., a non-transitory machine-readable storage medium). In some aspects, NFV may be utilized to virtualize any or all of the above-described network node functions via executable instructions stored in one or more computer-readable storage mediums (described in further detail below). A logical instantiation of the CN 140 may be referred to as a network slice, and a logical instantiation of a portion of the CN 140 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 150 may be an element offering applications that use IP bearer resources with the core network (e.g., UMTS PS domain, LTE PS data services, etc.). The application server 150 can also be configured to support one or more communication services (e.g., VoIP sessions, PTT sessions, group communication sessions, social networking services, etc.) for the UEs 110 via the CN 140.

In aspects, the CN 140 may be a 5GC, and the RAN may be connected with the CN 140 via an NG interface. In aspects, the NG interface may be split into two parts, an NG user plane (NG-U) interface, which carries traffic data between the RAN nodes 120 and a UPF, and the S1 control plane (NG-C) interface, which is a signaling interface between the RAN nodes 120 and AMFs.

Figure 2:
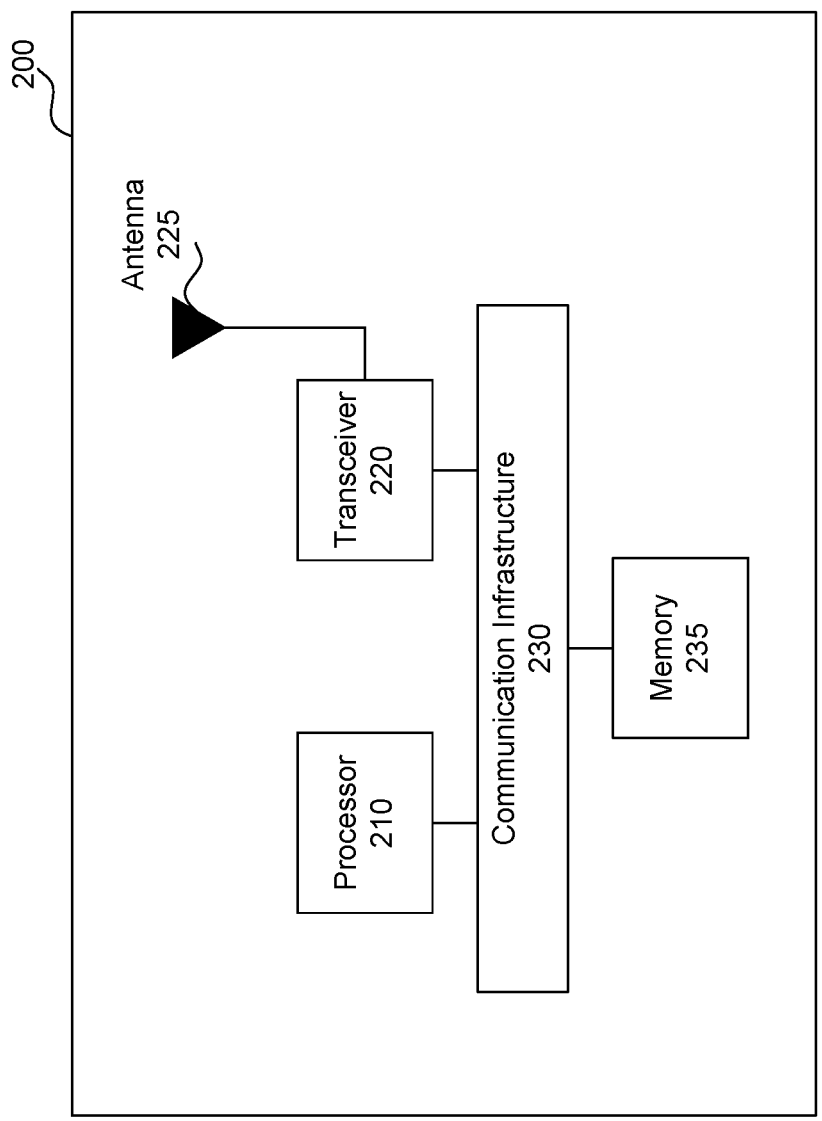
FIG. 2 illustrates a block diagram of an example wireless system of an electronic device implementing control messaging for multi-beam communications, according to some aspects.

FIG. 2 illustrates a block diagram of an example wireless system 200 of an electronic device implementing control messaging for multi-beam. As a convenience and not a limitation, system 200, may be described with elements of FIG. 1. System 200 can be UE 110 or RAN nodes 120 of FIG. 1. System 200 may include processor 210, transceiver 220, communication infrastructure 230, memory 235, and antenna 225 that together perform operations enabling group based reporting beam management. Transceiver 220 transmits and receives 5G wireless communications signals via antenna 225. Communication infrastructure 230 may be a bus. Memory 235 may include random access memory (RAM) and/or cache, and may include control logic (e.g., computer software), computer instructions, and/or data. Processer 210, upon execution of the computer instructions, can be configured to perform the functionality described herein for group based reporting beam management. Alternatively, processor 210 can include its own internal memory (not shown), and/or be "hard-wired" (as in a state-machine) configured to perform the functionality described herein for group based reporting beam management. Antenna 225 coupled to transceiver 220, may include one or more antennas, antenna arrays, and/or panels (not shown) that may be the same or different types to enable wireless communication over a wireless network.

In some aspects, a RAN node 120 may utilize the components of wireless system 200. According to some aspects, processor 210, alone or in combination with memory 235, and/or transceiver 220, implements the control messaging for multi-beam communications. For example, system 200 may generate Medium Access Control Control Elements (MAC CEs) and transmit these MAC CEs to a UE using transceiver 220 and/or antenna 225. UEs receiving the MAC CEs may then update TCI state information for communication channels. For example, these MAC CEs may update one or more component carriers (CCs) for a PDSCH and/or a PDCCH. The MAC CEs may also update spatial relations for SRS resource sets with different periodicities. TCI states and/or TCI codepoints may also be updated to support multi-TRP operations.

Figure 3A:
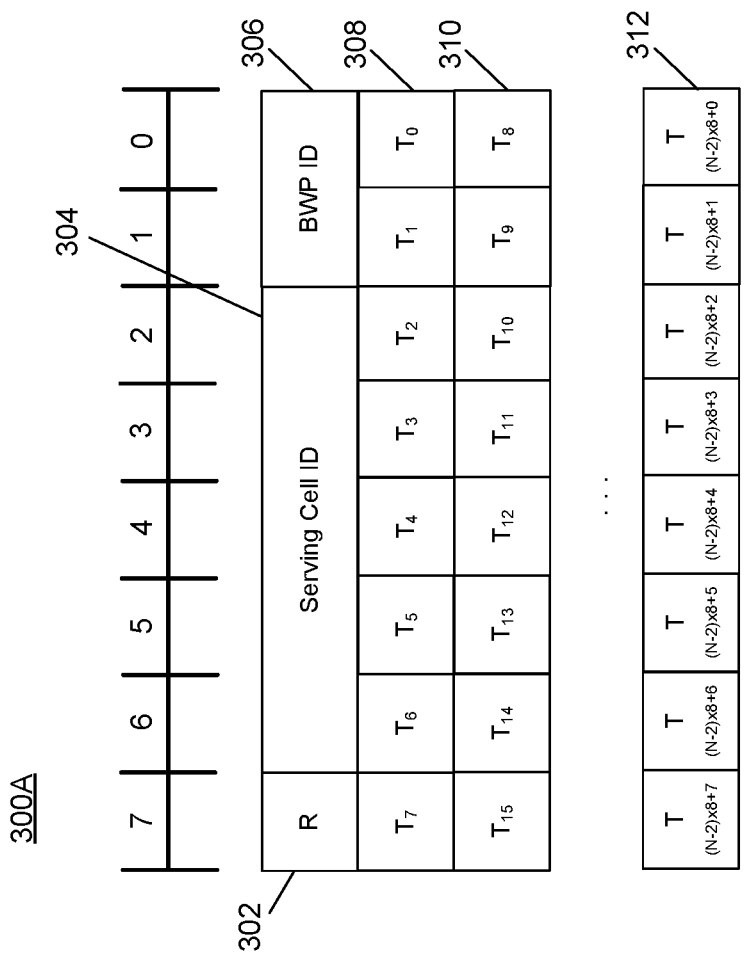
FIG. 3A illustrates a block diagram of a Medium Access Control Control Element (MAC CE) for updating a Transmission Configuration Indication (TCI) state for a Physical Downlink Shared Channel (PDSCH), according to some aspects.

FIG. 3A illustrates a block diagram of a Medium Access Control Control Element (MAC CE) 300A for updating a Transmission Configuration Indication (TCI) state for a Physical Downlink Shared Channel (PDSCH), according to some aspects. As will be further described below, the reserved bit 302 of MAC CE 300A may be utilized to indicate whether a list of component carriers (CCs) are to be updated based on an updated TCI state. Using the reserved bit 302 may allow for the updating of multiple TCI states for a PDSCH using a single MAC CE 300A. Rather than using multiple MAC CEs to individually update TCI states, the MAC CE 300A design may provide simultaneous updating of multiple TCI states and provide overhead savings as well as reduce latency.

MAC CE 300A may be a control message transmitted from a node to a UE to provide TCI state data to a UE. For example the node may be a RAN node 120 and the UE may be a UE 110 as described with reference to FIG. 1. MAC CE 300A may be a bitmap organized into octets of 8 bits. MAC CE 300A may include a reserved bit 302, serving cell ID 304, bandwidth part (BWP) ID 306, and octets 308, 310, 312 indicating TCI state information. The serving cell ID 304 may be a field indicating the identity of the serving cell for which the MAC CE 300A applies. As will be further described below, each component carrier (CC) may correspond to its own serving cell ID 304. Serving cell ID 304 may be a length of five bits. BWP ID 306 may indicate a downlink bandwidth part for which the MAC CE 300A applies. BWP ID 306 may be two bits in length.

Octets 308, 310, 312 may include TCI state information indicating the activation or deactivation status of a TCI state. For a particular value of "$T_i$", the field may be set to "1" to indicate that the TCI state is activated and mapped to a codepoint specified in a Downlink Control Information (DCI) message. If the field is set to "0", the TCI state may be deactivated and may not be mapped to the DCI message. The codepoint to which the TCI state is mapped may be determined by its ordinal position in the bitmap of MAC CE 300A.

Turning to reserved bit 302, rather than being reserved for non-use, reserved bit 302 may be used to indicate whether MAC CE 300A updates a single CC or a list of CCs. CCs may be frequency blocks assigned to a particular UE to increase the data rate. The CCs may be grouped by intra-band aggregation and/or inter-band aggregation. For intra-band aggregation, each CC may be in the same frequency band while inter-band aggregation may organize each CC into different frequency bands. For intra-band aggregation, the CCs may be contiguous or non-contiguous in frequency range. As previously explained, each CC may have a corresponding serving cell ID 304.

In some aspects, when reserved bit 302 is not set or set to a zero value, a node may indicate to a UE that MAC CE 300A is being used to update the TCI state for the CC indicated by serving cell ID 304. In contrast, when reserved bit 302 is set or set to a one value, the node may indicate to the UE that MAC CE 300A is being used to update a list of CCs. This list of CCs may be configured by a Radio Resource Control (RRC) message and may correspond to the indicated serving cell ID 304. When reserved bit 302 is set, the UE may update the TCI state information for each cell in the same list of CCs configured by the RRC message. The UE may identify the set value of reserved bit 302, identify the serving cell ID 304, and then update each CC in the list which includes the serving cell ID 304 in the manner indicated by octets 308, 310, 312. In some aspects, the bit setting of reserved bit 302 may be reversed, where a one value indicates a single CC update and a zero value indicates updating the list of CCs.

Using MAC CE 300A in this manner may allow for the node to direct the UE to update TCI states for multiple CCs using fewer control messages. Using reserved bit 302 may allow for the simultaneous updating of a list of CCs. This updating may aid in facilitating multi-beam communications as well as provide flexibility for updating a single CC and/or updating multiple CCs. This updated TCI state information may aid in updating TCI states for the PDSCH.

Figure 3B:
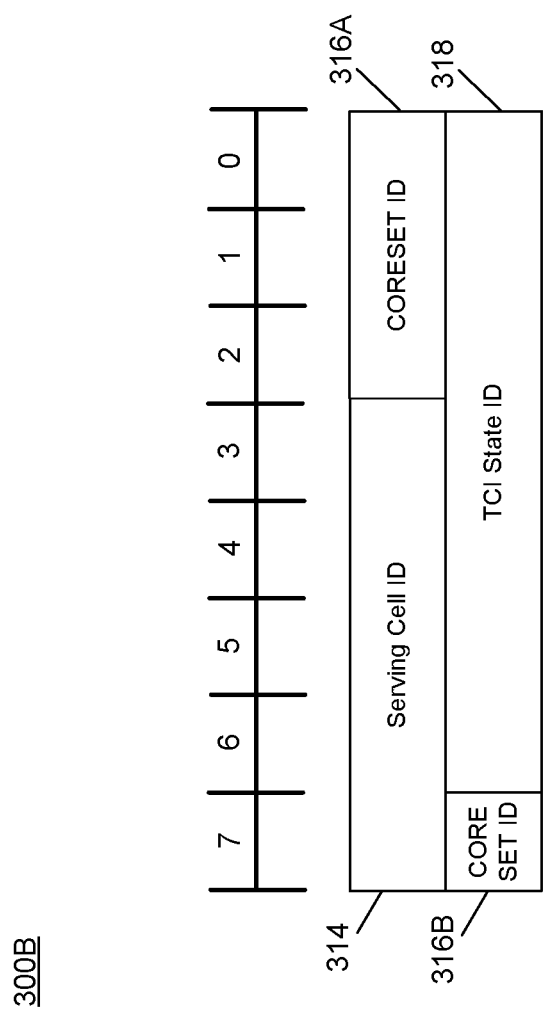
FIG. 3B illustrates a block diagram of a MAC CE for updating a Transmission Configuration Indication (TCI) state for a Physical Downlink Control Channel (PDCCH), according to some aspects.

FIG. 3B illustrates a block diagram of a MAC CE 300B for updating a Transmission Configuration Indication (TCI) state for a Physical Downlink Control Channel (PDCCH), according to some aspects. Similar to MAC CE 300A, a reserved bit in MAC CE 300B may be used to indicate whether a list of component carriers (CCs) are to be updated based on an updated TCI state. Using this reserved bit may allow for the updating of multiple TCI states for a PDCCH using a single MAC CE 300B. Rather than using multiple MAC CEs to individually update TCI states, the MAC CE 300B design may provide simultaneous updating of multiple TCI states and provide overhead savings as well as reduce latency.

MAC CE 300B may be a control message transmitted from a node to a UE to provide TCI state data to a UE. For example the node may be a RAN node 120 and the UE may be a UE 110 as described with reference to FIG. 1. MAC CE 300B may be a bitmap organized into octets of 8 bits. MAC CE 300B may include a serving cell ID 314, CORESET ID 316A-316B, and TCI State ID 318. Similar to MAC CE 300A, the serving cell ID 314 may be a field indicating the identity of the serving cell for which the MAC CE 300B applies. Each component carrier (CC) may correspond to its own serving cell ID 314. Serving cell ID 314 may be a length of five bits. CORESET ID 316A-316B may be an identification for a Control Resource Set for which the MAC CE 300B applies to update the TCI state. The CORESET corresponds to the PDCCH. CORESET ID 316A-316B may be four bits in length and may be conveyed in two octets. TCI State ID 318 may be a TCI state applicable to the CORESET identified by CORESET ID 316A-316B. Seven bits may be reserved for TCI state ID 318 based on the octet alignment.

While seven bits are reserved for TCI state ID 318, an RRC message may configure up to 64 TCI states. Because of this configuration, 6 bits may be used to capture the 64 TCI states even though TCI state ID 318 reserves seven bits.

In this manner, 1 bit may be unused in TCI state ID 318. Rather than leaving this bit unused, similar to MAC CE 300A, this bit may be used to indicate whether a list of CCs are to be updated. In particular the most significant bit (MSB) or the least significant bit (LSB) of the TCI state ID 318 field may be used to indicate whether to update the TCI state for a list of CCs.

Similar to MAC CE 300A, when this bit is not set or set to a zero value, a node may indicate to a UE that MAC CE 300B is being used to update the TCI state for the CC indicated by serving cell ID 314. In contrast, when this bit is set or set to a one value, the node may indicate to the UE that MAC CE 300B is being used to update a list of CCs. This list of CCs may be configured by a Radio Resource Control (RRC) message and may correspond to the indicated serving cell ID 314. When the bit is set, the UE may update the TCI state information for each cell in the same list of CCs configured by the RRC message. The UE may identify the set value of the bit, identify the serving cell ID 314, and then update each CC in the list which includes the serving cell ID 314 in the manner indicated by the six bits of TCI state ID 318. In some aspects, the bit setting of the unused bit may be reversed, where a one value indicates a single CC update and a zero value indicates updating the list of CCs.

Using MAC CE 300B in this manner may allow for the node to direct the UE to update TCI states for multiple CCs using fewer control messages. Using the unused bit of TCI state ID 318 may allow for the simultaneous updating of a list of CCs. This updating may aid in facilitating multi-beam communications as well as provide flexibility for updating a single CC and/or updating multiple CCs. This updated TCI state information may aid in updating TCI states for the PDCCH.

In some aspects, another MAC CE may be defined and provide TCI state information for a PDSCH which includes one or two TCI states. For example, this situation may be a multi-TRP scenario. In this case, a UE may be communicating with multiple nodes which may result in the activation of two TCI states. The network may use this MAC CE to update the TCI codepoint for a PDSCH in a list of CCs. The updated TCI codepoint may be applied to the list corresponding to a serving cell ID as described with reference to FIG. 3A and FIG. 3B. The application of the updated TCI codepoint may indicate that multi-TRP operation is activated and/or deactivated for the CCs in the list.

In some aspects, the updated TCI codepoint may be applied to a subset of the CCs in the CC list depending on different conditions. CCs that meet one or more of these conditions may be updated. The conditions may include:

The CC is configured with at least one CORESET without a value for CORESETPoolIndex or with a CORESET-PoolIndex set to zero and with at least one CORESET with CORESETPoolIndex set to one.

The CC is configured with RepNum16 in at least one entry in PDSCH-TimeDomainResourceAllocationRep-SchemeEnabler.

The CC is configured with RepSchemeEnabler.

These conditions may aid when updating TCI states in a multi-TRP operation. By using one or more of these conditions, a UE may control the updating of TCI states even when multiple TCI states corresponding to a particular TCI codepoint.

Figure 4:
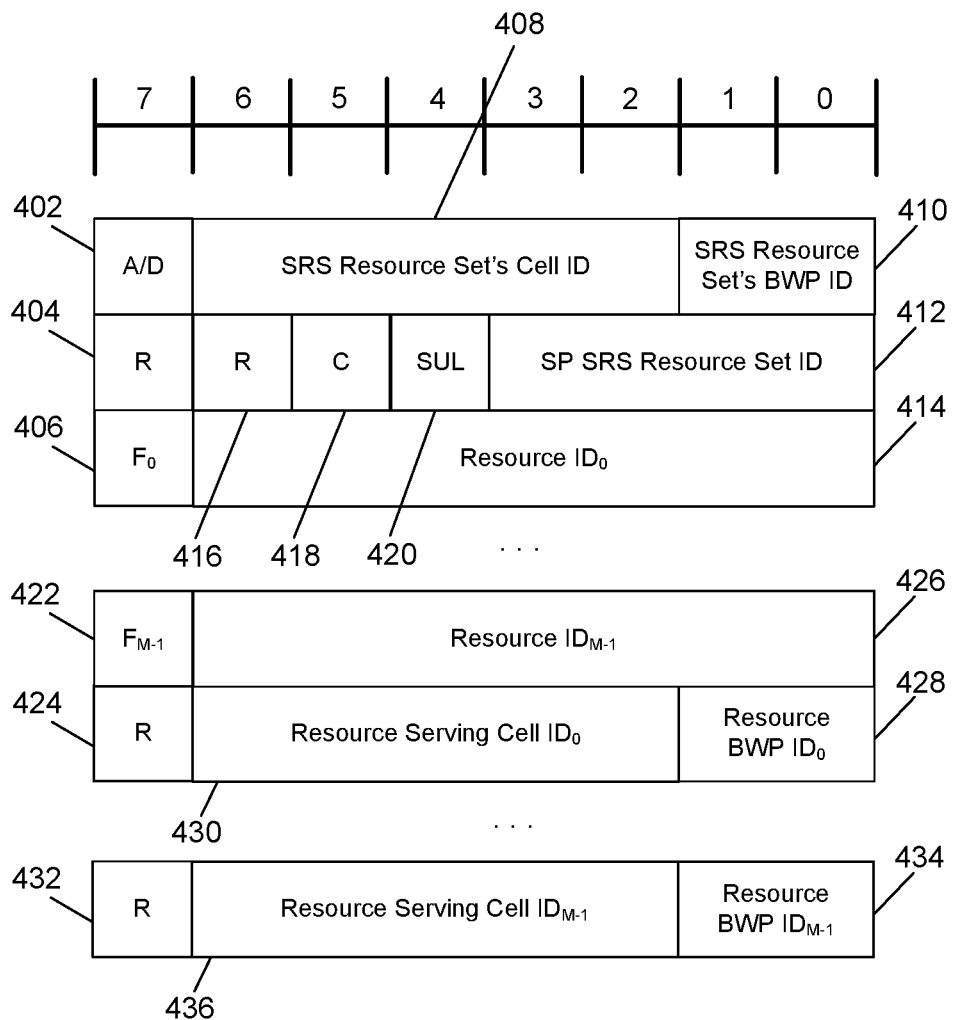
FIG. 4 illustrates a block diagram of a MAC CE for the activation and deactivation of a Sounding Reference Signal (SRS) resource set, according to some aspects.

FIG. 4 illustrates a block diagram of a MAC CE 400 for the activation and deactivation of a Sounding Reference Signal (SRS) resource set, according to some aspects. A node may transmit MAC CE 400 to a UE to indicate a spatial relation for the UE to transmit a SRS resource set. MAC CE 400 may be used to activate and/or deactivate a semi-persistent (SP) SRS resource set. MAC CE 400 may be configured to also provide spatial relation data for other periodicities such as an aperiodic or periodic SRS resource set. Using MAC CE 400, a UE may update its spatial relation information when transmitting an SRS signal to the node.

An SRS is a reference signal used in the uplink direction from the UE to a node to aid the node in obtaining the channel state information (CSI) for each UE. The CSI may describe how signals propagate from the UE to the node and may represent the effects of scattering, fading, power decay with distance, and/or other channel elements. The node may use the SRS for resource scheduling, link adaption, MIMO communications, and/or beam management. The UE may transmit an SRS using different periodicities. For example, the different periodicities may be "periodic," "aperiodic," and/or "semi-persistent" (SP). An SRS may be identified as an SRS resource, which may refer to a location of an SRS in a time and frequency domain in a resource grid. An SRS resource set may refer to a number of SRS resources transmitting at different symbols.

In view of this description and SRS organization, a node may generate MAC CE 400 to update spatial relations for an SRS resource set at a UE. While FIG. 4 depicts an example MAC CE 400 for controlling a SP SRS Resource Set, MAC CE 400 may also be configured to provide spatial relation updates for aperiodic and periodic SRS resource sets. In this manner, MAC CE 400 may support spatial relation updating for different periodicities. As will be further explained below, MAC CE 400 may also support the updating of spatial relations for a list of CCs.

For the SP SRS Resource Set scenario, MAC CE 400 may include an "activate or deactivate" (A/D) bit 402 used to activate or deactivate an SP SRS Resource Set indicated by SP SRS Resource Set ID 412. The length of SP SRS Resource Set ID 412 may be four bits in length. MAC CE 400 may also include SRS Resource Set's Cell ID 408 which may indicate the identity of the serving cell or CC which includes the activated or deactivated SP SRS Resource Set. The length of SRS Resource Set's Cell ID 408 may be five bits. MAC CE 400 may also include SRS Resource Set's BWP ID 410, which may indicate an uplink bandwidth part including the activated or deactivated SP SRS Resource Set. The length of SRS Resource Set's BWP ID 410 may be two bits.

MAC CE 400 may include a SUL bit 420. This field indicates whether MAC CE 400 applies to the NUL carrier or SUL carrier configuration. SUL bit 420 may be set to "1" to indicate that MAC CE 400 applies to the SUL carrier configuration. SUL bit 420 may be set to "0" to indicate that MAC CE 400 applies to the NUL carrier configuration.

"C" bit 418 as well as the other octets will now be described. MAC CE 400 may also include a "C" bit 418, which may indicate whether the octets containing Resource Serving Cell ID field(s) 430, 436 and Resource BWP ID field(s) 428, 434 are present. If this field is set to "1", the octets containing Resource Serving Cell ID field(s) 430, 436 and Resource BWP ID field(s) 428, 434 are present. If this field is set to "0", they are not present and the resources indicated in the Resource ID$_i$ fields 414, 426 may be located on the Serving Cell and BWP indicated by SRS Resource Set's Cell ID 408 and SRS Resource Set's BWP ID 410.

The "F" bit 406, 422 may refer to the type of resource used as a spatial relationship for a SRS resource. F$_0$ may refer to the first SRS resource within the resource set while F1 to the second and so on. "F" bit 406 may be set to "1"

to indicate NZP CSI-RS resource index is used. "F" bit 406 may be set to "0" to indicate either SSB index or SRS resource index is used.

The Resource ID fields 414, 426 may include an identifier of the resource used for spatial relationship derivation for an SRS resource i. The Resource ID fields 414, 426 may indicate the particular reference signal to use. For example, Resource $ID_0$ may refer to the first SRS resource within the resource set. If $F_i$ is set to "0" and the first bit of the Resource ID field is set to "1", then the remainder of the field includes the SSB-Index. If $F_i$ is set to "0" and the first bit of the field is set to "0", then the remainder the field includes SRS-ResourceId. The length of Resource ID fields 414, 426 may be seven bits.

Resource Serving Cell ID fields 430, 436 may indicate the identity of the serving cell on which the resource used for spatial relationship derivation for SRS resource "i" is located. The length of the field may be five bits. Resource BWP ID field 428, 434 may include BWP-ID for an uplink bandwidth part on which the resource used for spatial relationship derivation for SRS resource "i" is located. The length of the field may be 2 bits.

While MAC CE 400 may also include reserve bits 404, 416, these reserve bits 404, 416 may be used to support different SRS resource set periodicities and/or to indicate whether to update spatial relations for a list of CCs.

For example, in some aspects, the SP SRS Resource Set ID field 412 may be used to indicate the periodicity and/or time domain pattern of the SRS Resource Set. For example, rather than being limited to only the semi-persistent case, the four bits of the SP SRS Resource Set ID field 412 may indicate that MAC CE 400 may be used to update a periodic, aperiodic, or semi-persistent SRS Resource Set. MAC CE 400 may further include an indication of whether a particular CC as indicated by the SRS Resource Set's Cell ID 408 is to be updated or whether a list of CCs are to be updated.

When the SP SRS Resource Set ID field 412 indicates that the SRS Resource set is aperiodic or periodic, the UE may ignore "A/D" bit 402. That is, the "A/D" bit 402 may not indicate an activation or deactivated or the indicated SRS resource set corresponding to SP SRS Resource Set ID field 412. Instead, "A/D" bit 402 may be used to indicate whether a spatial relation update is to be applied to the particular SRS Resource Set's Cell ID 408 or to a list of CCs found in the same CC list as the indicated cell. This list updating may be similar to the one described with reference to FIG. 3A and FIG. 3B. In some aspects, a reserved bit 404, 416 may be used instead of "A/D" bit 402 to indicate whether a particular CC or list of CCs is to be updated. In either case, however, the spatial relation may be updated for multiple SRS Resource Sets using MAC CE 400.

In an aspect where the SP SRS Resource Set ID field 412 indicates that the SRS Resource set is semi-persistent, however, the "A/D" bit 402 may have a value. In this case, a reserved bit 404, 416 may be used to indicate whether a particular CC or list of CCs is to be updated.

In some aspects, when MAC CE 400 is used to update a list of CCs, the SRS resource spatial relation is updated when the corresponding SRS resource set has the same time domain pattern. For example, in some cases, CCs may have different time domain patterns. In this case, the spatial relation may not be applied to update the list of CCs. In cases where the CCs in the list have the same periodicity and/or time domain pattern as indicated from the SP SRS Resource Set ID field 412, however, MAC CE 400 may be applied to the list of CCs. Potentially due to the differences in the time domain pattern, however, an update to a beam may be desired on a per-resource level.

Figure 5:
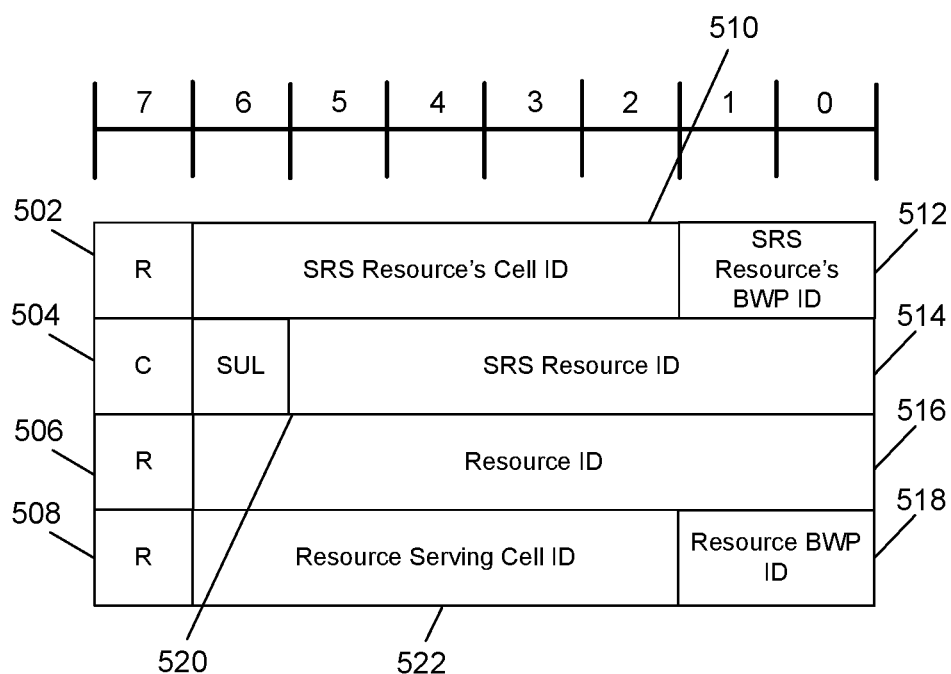
FIG. 5 illustrates a block diagram of a MAC CE for updating a spatial relation for a Sounding Reference Signal (SRS) resource, according to some aspects.

FIG. 5 illustrates a block diagram of a MAC CE 500 for updating a spatial relation for a Sounding Reference Signal (SRS) resource, according to some aspects. As explained above, while some scenarios may benefit from the updating an SRS resource set, some other scenarios may benefit from updating an individual SRS resource. For example, updating a specific SRS resource may allow for pinpointing the resource and updating a specific beam for that resource. MAC CE 500 may be a control message that provides this type of resource level updating. MAC CE 500 may provide more precise resource updating. MAC CE 500 may still be used to indicate whether a spatial relation is to be updated for a specific CC or a list of CCs. In some aspects, the first 16 bits of MAC CE 500 may indicate a particular SRS resource while the second 16 bits may indicate the updated beam information. MAC CE 500 may be four octets in length.

In particular, MAC CE 500 may include reserved bits 502, 506, 508, which may be used to indicate whether the spatial relation update is for a CC specified by SRS Resource's Cell ID 510 or whether the spatial relation update is for a list of CCs. The updating of the list of CCs may occur in a manner similar to that described with reference to FIG. 3A and FIG. 3B. Similar to FIG. 4, SRS Resource's Cell ID 510 may refer to a cell in which a SRS resource is located. Rather than indicating a SRS resource set, SRS Resource's Cell ID 510 may correspond to a particular resource. Similarly, SRS Resource's BWP ID 512 may correspond to the BWP in which the SRS resource is located. SRS resource ID 514 may be the identification SRS-ResourceID configured by a RRC message. SUL 510 may be similar to SUL 420 as described with reference to FIG. 4. Using SRS Resource's Cell ID 510, SRS Resource's BWP ID 512, and/or SRS resource ID 514 may allow a UE to identify a particular SRS Resource to be updated by MAC CE 500.

"C" bit 504 may also be similar to "C" bit 418 as described with reference to FIG. 4. In particular, "C" bit 504 may indicate whether the following two octets of bit information exist. In MAC CE 500, these two octets may provide information for the particular resource being updated. For example, Resource ID 516 may be similar to Resource ID 414, 426 as described with reference to FIG. 4. Resource ID 516 may be the ID of the resource used for the spatial relation update. For example, Resource ID 516 may indicate the particular beam to be used. Resource Serving Cell ID 522 may be the cell ID where the resource for the spatial relation is located. Resource BWP ID 518 may indicate the BWP ID where the resource for spatial relation is located.

Using MAC CE 500 may allow for specific updating of a resource rather than a resource set. MAC CE 500 may provide additional flexibility for updating spatial relations. MAC CE 500 may also be used to update the spatial relation for a list of CCs to reduce messaging overhead and/or reduce latency.

Figure 6A:
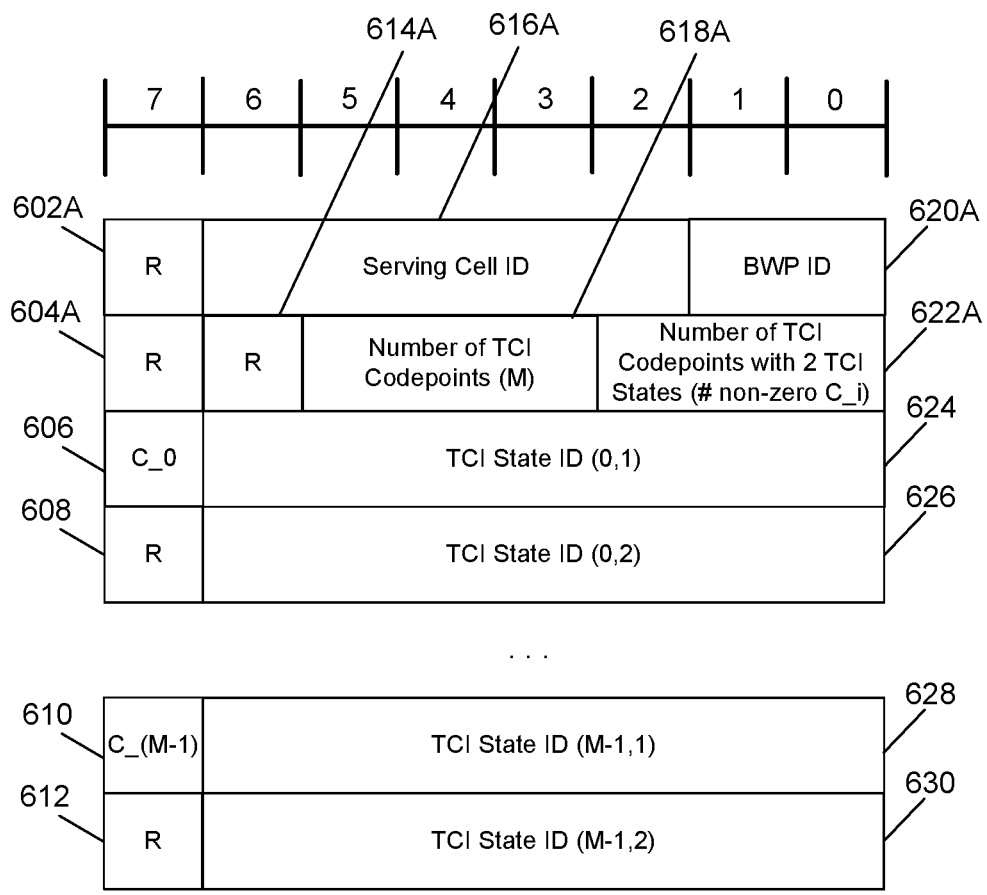
FIG. 6A illustrates a block diagram of a MAC CE for configuring TCI codepoints for a PDSCH to support multi-Transmission Reception Point (multi-TRP) operation, according to some aspects.

FIG. 6A illustrates a block diagram of a MAC CE 600A for configuring TCI codepoints for a PDSCH to support multi-Transmission Reception Point (multi-TRP) operation, according to some aspects. As previously explained, a multi-TRP scenario may occur when a UE communicates with more than one antenna array or node. In this case, each TCI codepoint may either include 1 or 2 TCI states. In this manner, MAC CE 600A provides control messaging to support multi-TRP operation and to configure TCI codepoints for a PDSCH.

Similar to the previously described MAC CEs, MAC CE 600A may include reserved bits 602A, 604A, 614A. Reserved bit 602A, 604A, 614A may be used to indicate whether a TCI state is to be updated for a CC or for a list of CCs. MAC CE 600A may include Serving Cell ID 616A and BWP ID 620A which may be similar to Serving Cell ID 304 and BWP ID 306 as described with reference to FIG. 3A. MAC CE 600A may include a number of TCI codepoints field 618A which may be three bits to indicate a number "M". These three bits may be used to indicate up to eight TCI codepoints or may indicate a number of TCI codepoints from 1 to 8. The M value may provide this number. Each of the TCI codepoints, however, may have either 1 or 2 TCI states. To capture this information, MAC CE 600A may include field 622A which may indicate the number of TCI codepoints with 2 TCI states. Field 622A may be a count of the number of "C_i" bit values 606, 610 having a non-zero value, such as being set as a "1" value. When a "C_i" bit value 606, 610 has a "1" value, the corresponding TCI codepoint may have two TCI states. For example, "C_i" may indicate whether a second TCI state is used for TCI codepoint "i".

MAC CE 600A may include TCI State ID (0,1) 624 and TCI State ID (0,2) 626 to illustrate an example where "C_0" 606 has two TCI states. TCI State ID (0,1) 624 may be a first TCI state for TCI codepoint "0" while TCI State ID (0,2) 626 may be a second TCI state for TCI codepoint "0". Reserved bit 608 may be included to preserve the octet configuration for MAC CE 600A.

Similarly, MAC CE 600A may include TCI State ID (M-1,1) 628 and TCI State ID (M-1,2) 630 to illustrate an example where "C_(M-1)" 610 has two TCI states. TCI State ID (M-1,1) 628 may be a first TCI state for TCI codepoint "M-1" while TCI State ID (M-1,2) 630 may be a second TCI state for TCI codepoint "M-1". Reserved bit 612 may be included to preserve the octet configuration for MAC CE 600A.

Using MAC CE 600A may allow for flexibility in accommodating TCI codepoints having one or two TCI states. Using the "C_i" bits 606, 610, the UE may be able to decode the octets to determine whether one or two TCI states will be updated. Further, using a reserved bit 602A, 604A, or 614A may still provide the list updating for a CC to reduce overhead and latency.

Figure 6B:
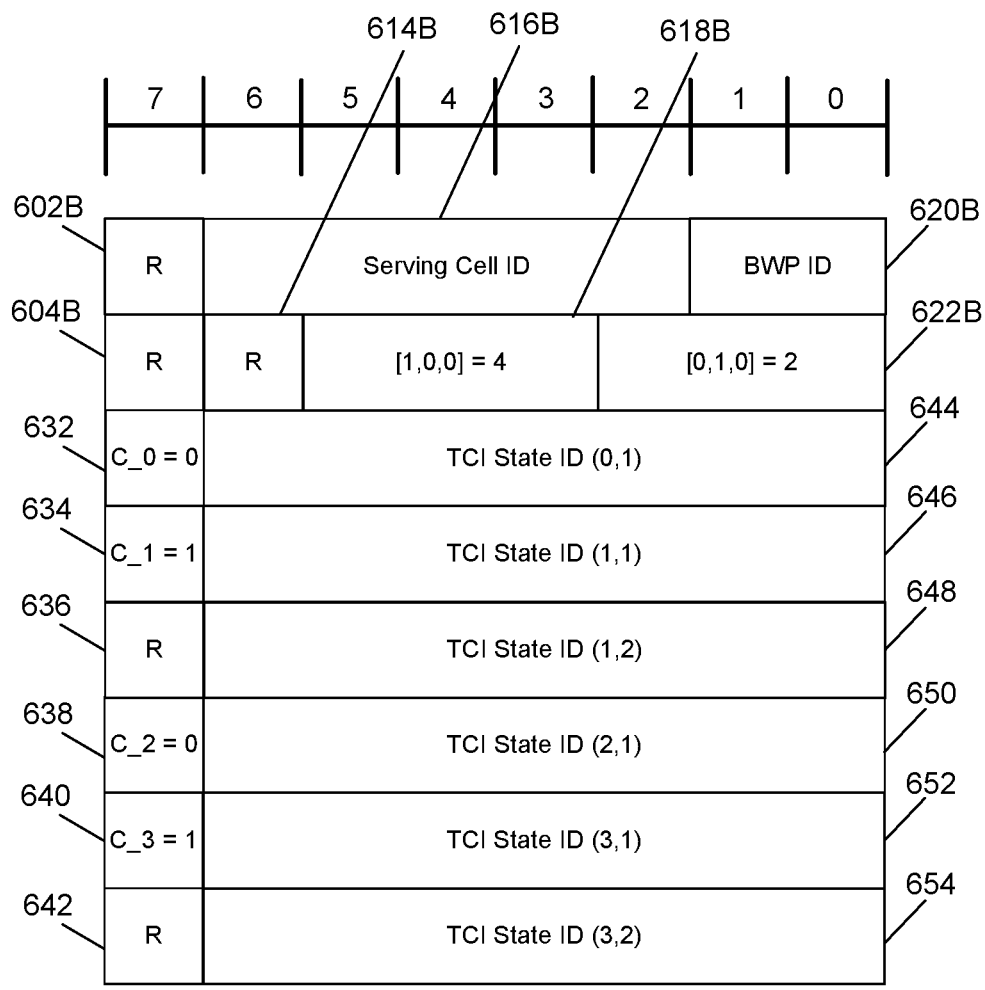
FIG. 6B illustrates a block diagram of an example MAC CE indicating multiple TCI states, according to some aspects.

FIG. 6B illustrates a block diagram of an example MAC CE 600B indicating multiple TCI states, according to some aspects. MAC CE 600B may be an example aspect of MAC CE 600A. Similar to MAC CE 600A, MAC CE 600B may include reserved bits 602B, 604B, 614B as well as Serving Cell ID 616B and BWP ID 620B. MAC CE 600B may provide an example with exemplary values for fields 618B and 622B.

For example, MAC CE 600B may indicate an "M" value of "4" using bits of the number of TCI codepoints field 618B which may be similar to field 618A as described with reference to FIG. 6A. Similarly, MAC CE 600B may indicate a value of "2" for field 622B which may be similar to field 622A and may indicate the number of codepoints having two TCI states. In this case, the UE may recognize the number of octets to follow in the remaining transmission. In particular, the UE may identify that two of the TCI codepoints will have two TCI states and will therefore use four octets. The UE may the use the "M" value to identify two remaining TCI codepoints having one TCI state which will use one octet each. With this information, the UE may anticipate the reception of six octets. The UE may then identify the values for each "C_i" 632, 634, 638, and 640 to determine whether the particular TCI codepoint corresponds to one or two TCI states.

To further illustrate this example, "C_0" 632 may be a zero value, which may indicate a single TCI state. TCI state ID (0,1) 644 may then provide the state information for that TCI codepoint. Upon identifying "C_0" 632 as a zero value, the UE may identify the following 7 bits as relating to the single TCI state. "C_1" 634 may be a one value, which may indicate the presence of two TCI states. In this manner, TCI State ID (1,1) 646 and TCI State ID (1,2) 648 may provide the information for the two TCI states. Reserved bit 636 may be used to maintain the octet configuration for MAC CE 600B. Upon identifying "C_1" 634 as a one value, the UE may identify the following 15 bits as relating to the two TCI states. "C_1" 634 may be a one value, which may indicate the presence of two TCI states. UE may continue to identify "C_2" as having a zero value and indicating a single TCI state. TCI state ID (2,1) 650 may then provide the state information for that TCI codepoint. For "C_3" 640, the UE may identify a one value and may identify two TCI states. TCI State ID (3,1) 652 and TCI State ID (3,2) 654 may provide the information for the two TCI states. Reserved bit 642 may be used to maintain the octet configuration for MAC CE 600B.

Figure 7:
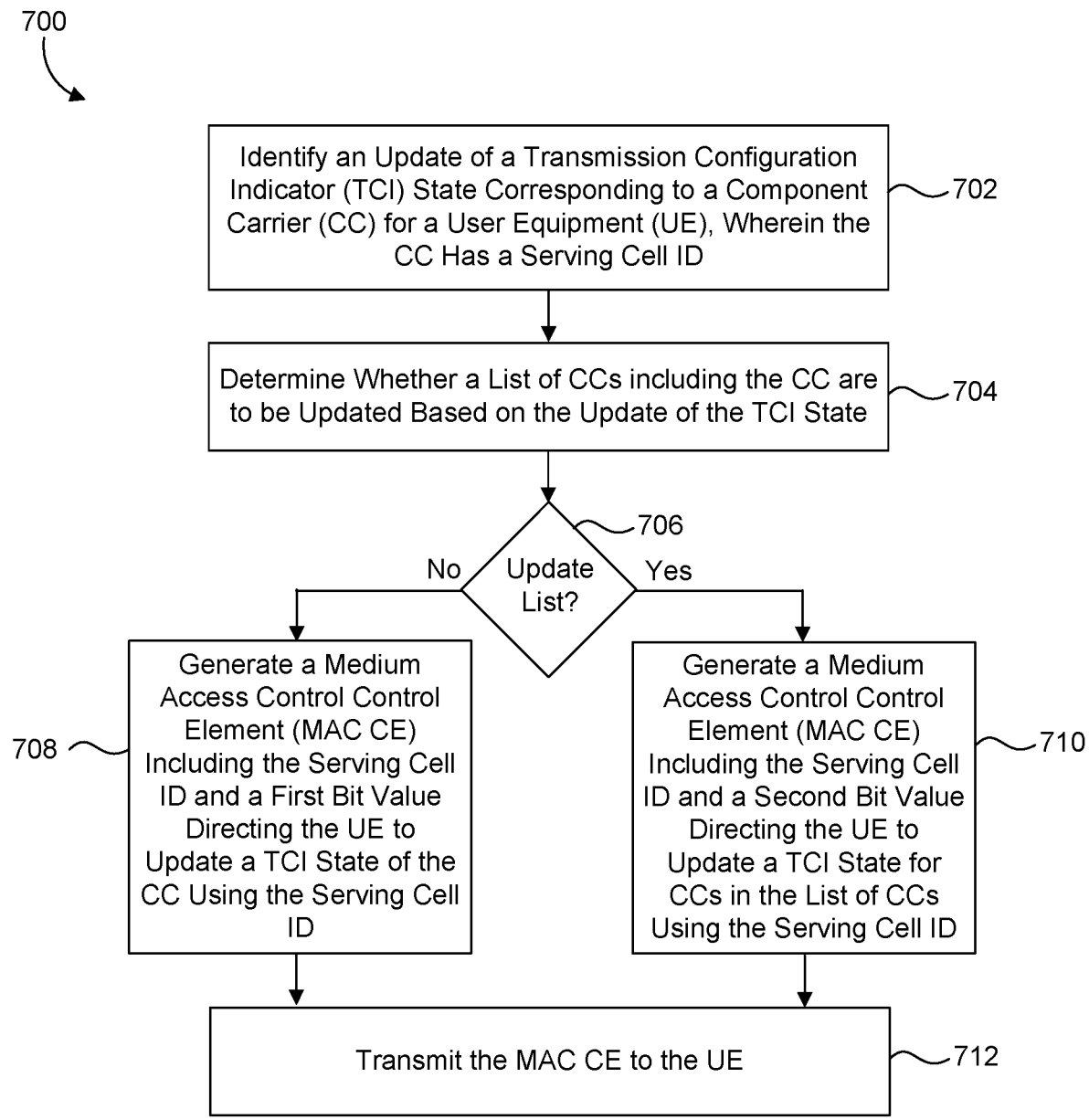
FIG. 7 illustrates a flowchart for updating TCI states for a list of component carriers (CCs) for a user equipment (UE), according to some aspects.

FIG. 7 illustrates a flowchart 700 for updating TCI states for a list of component carriers (CCs) for a user equipment (UE), according to some aspects. In some aspects, a network, such as core network 140, network elements 130, application server 150, a node 120, and/or wireless system 200 may execute flowchart 700. In some aspects, a RAN node 120 may generate and transmit a MAC CE to a UE using flowchart 700. Flowchart 700 shall be described with reference to a RAN node 120; however, flowchart 700 is not limited to that example aspect. Flowchart 700 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7, as will be understood by a person of ordinary skill in the art.

At 702, RAN node 120 may identify an update of a transmission configuration indicator (TCI) state corresponding to a component carrier (CC) for a user equipment (UE) 110, wherein the CC has a serving cell ID. This update may be an update of beams or QCL signals. For example, a UE 110 may have an assumption of QCL relationships between different reference signals. RAN node 120 may update this assumption, however, and may provide an updated definition for QCL assumptions. In this manner, RAN node 120 may provide an initial definition of TCI states and/or may update existing definitions at the UE 110.

The update may also affect one or more CCs. Similarly, the updated TCI state may be applicable to a PDSCH and/or a PDCCH. In some aspects, the update for the PDSCH may occur in a multi-TRP scenario where TCI codepoints have one or two TCI states. In this case, a subset of CCs in a CC list may be updated.

At 704, RAN node 120 may determine whether a list of CCs including the CC are to be updated based on the update of the TCI state. This list of CCs may have been previously configured by a Radio Resource Control (RRC) message and may correspond to the indicated serving cell ID. For example, the RRC may have previously configured TCI related parameters. RAN node 120 may have previously transmitted the RRC message to the UE 110 to configure the list of CCs. The update of the TCI state information may be applicable to other CCs in a list which also includes the CC corresponding to the serving cell ID.

At 706, RAN node 120 may determine whether a list of CCs is to be updated at the UE 110. If a list of CCs is not to be updated and the RAN node 120 intends to update the CC corresponding to the serving cell ID, RAN node 120 may generate a medium access control control element (MAC CE) at 708. This MAC CE may include the serving cell ID and a first bit value directing the UE 110 to update a TCI state of the CC using the serving cell ID. The first bit value may be, for example, a zero value. The MAC CE may also include the TCI State information for updating the TCI state at UE 110. RAN node 120 may then transmit the MAC CE to the UE 110 at 712. UE 110 may then update the CC corresponding to the Serving Cell ID using TCI state information included in the MAC CE.

Returning to 706, RAN node 120 may determine that a list of CCs is to be updated. In this case, RAN node 120 may generate a MAC CE including the Serving Cell ID and a second bit value directing the UE 110 to update a TCI state for CCs in the list of CCs, which includes the serving cell ID. In this manner, the UE 110 may update the CC corresponding to the serving cell ID as well as the other CCs on the list configured by the RRC message. The MAC CE may also include the TCI State information for updating the TCI state at UE 110. This MAC CE may then provide TCI updating for multiple CCs, which may reduce messaging overhead. At 712, RAN node 120 may transmit the MAC CE to the UE 110.

The MAC CE generated from flowchart 700 may be similar to the MAC CEs 300A and 300B as previously explained with reference to FIG. 3A and FIG. 3B. For example, MAC CE 300A may be used to update a TCI state for a PDSCH while MAC CE 300B may be used to update TCI state for PDCCH. Other values may be included in the MAC CE as well as previously described with reference to FIG. 3A and FIG. 3B.

As previously described the MAC CE may also be used in a multi-TRP operation. Similarly, the MAC CE may be applied to situations where a CC list includes the identified CC. In some aspects, a subset of CCs may be updated based on some conditions as previously described.

In some aspects, flowchart 900 may be performed over one or more iterations depending on changes to TCI codepoints. For example, TCI states may be updated using a first MAC CE but then at a later time may be updated again with a second MAC CE. Similarly, a second MAC CE may correspond to an update for the same TCI state or a different TCI state. In this manner, the aspects described with respect to flowchart 900 are not limited to a single MAC CE.

Figure 8A:
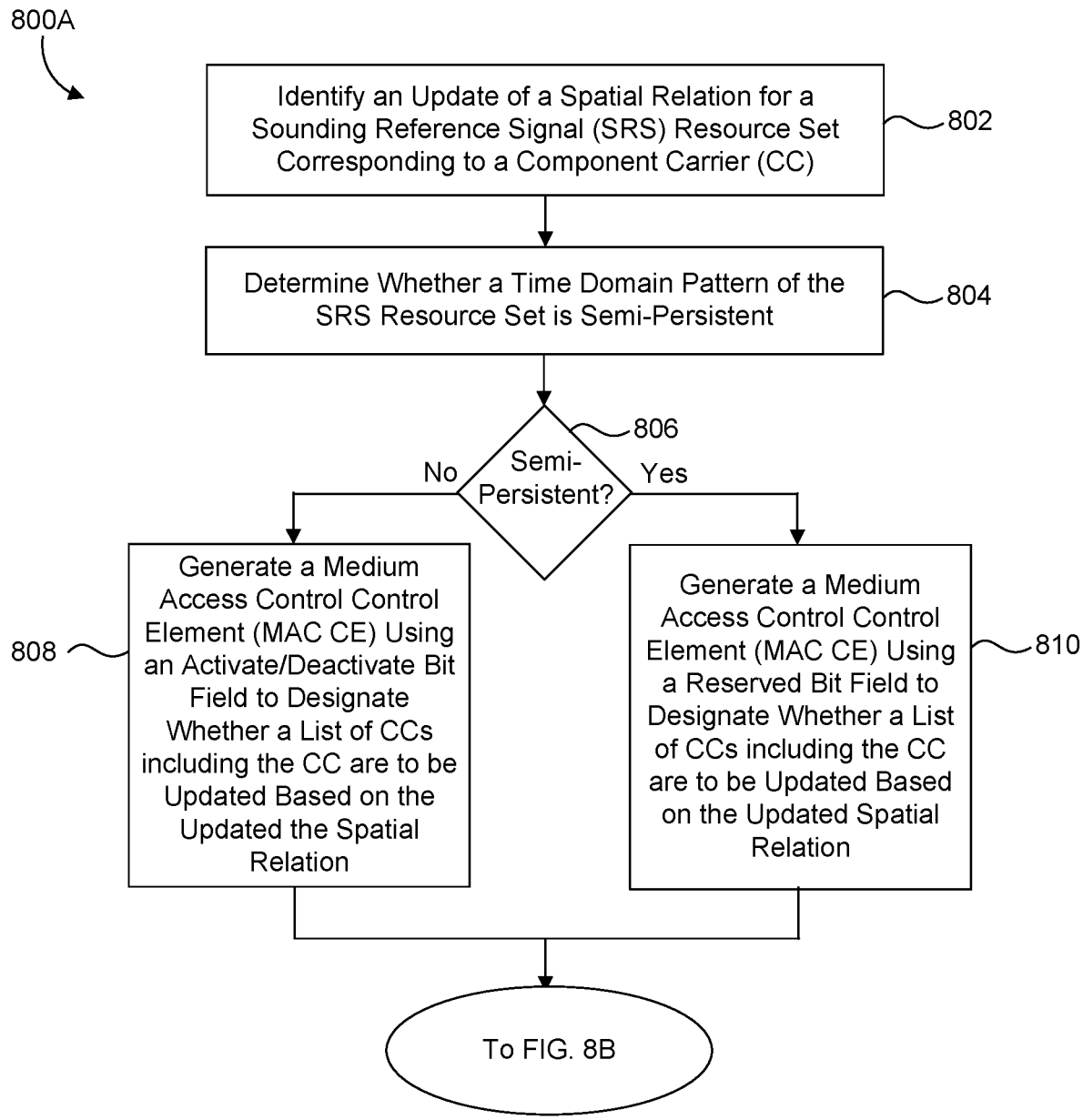
FIG. 8A illustrates a flowchart for generating a MAC CE to update spatial relations for SRS resource sets having different periodicity, according to some aspects.
Figure 8B:
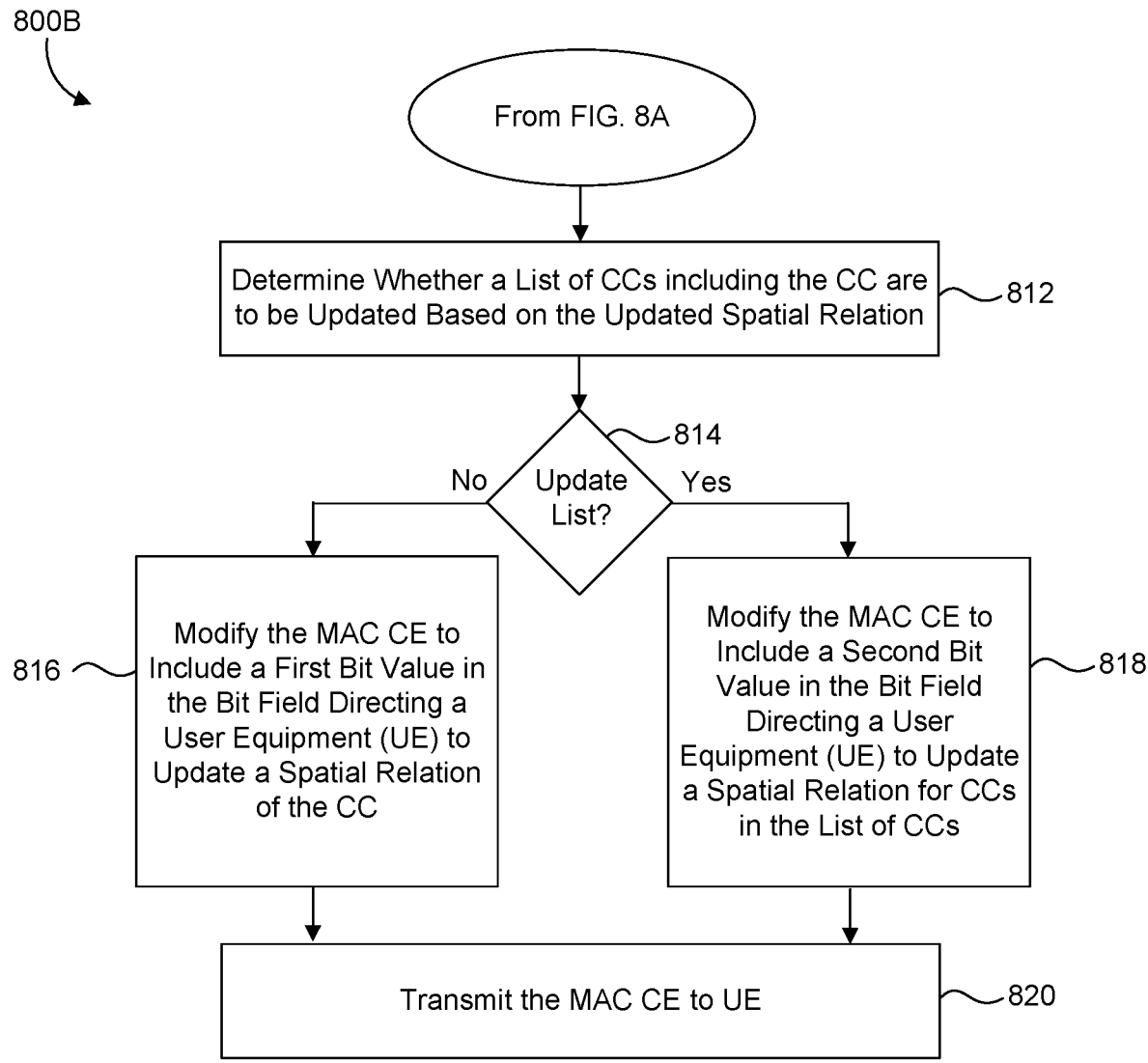
FIG. 8B illustrates a flowchart for modifying a MAC CE to update spatial relations for a list of CCs, according to some aspects.

FIG. 8A illustrates a flowchart 800A for generating a MAC CE to update spatial relations for SRS resource sets having different periodicity and/or time domain patterns, according to some aspects. FIG. 8B illustrates a flowchart 800B for modifying a MAC CE to update spatial relations for a list of CCs, according to some aspects.

In some aspects, a network, such as core network 140, network elements 130, application server 150, a node 120, and/or wireless system 200 may execute flowcharts 800A and 800B. In some aspects, a RAN node 120 may generate and transmit a MAC CE to a UE using flowcharts 800A and 800B. Flowcharts 800A and 800B shall be described with reference to a RAN node 120; however, flowcharts 800A and 800B are not limited to that example aspect. Flowcharts 800A and 800B may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 8A and FIG. 8B, as will be understood by a person of ordinary skill in the art.

At 802, RAN node 120 may identify an update of a spatial relation for a sounding reference signal (SRS) resource set corresponding to a Component Carrier (CC). The spatial relation for the SRS may be an update for one or more uplink signals transmitted by UE 110 to RAN node 120.

At 804, RAN node 120 may determine whether a time domain pattern of the SRS resource set is semi-persistent. For example, a time domain pattern and/or periodicity of the SRS resource set may be semi-persistent, aperiodic, or periodic. At 806, if the time domain pattern is determined not to be semi-persistent, RAN node 120 may generate a MAC CE, such as MAC CE 400 using an "activate/deactivate" bit field to designate whether a list of CCs including the CC are to be updated based on the updated spatial relation. The "A/D" field may be an unused bit field. Because the "A/D" field is not used for periodic or aperiodic SRS resource set updates, this bit may be used to indicate whether a spatial relation update is intended for an indicated CC or a list of CCs corresponding to the same CC list as the indicated CC.

At 806, if the SRS resource set is determined to be semi-persistent, RAN node 120 may generate a MAC CE, such as MAC CE 400, using a reserved bit field to designate whether a list of CCs including the CC are to be updated based on the updated spatial relation at 810. Because the "A/D" field is used in the semi-persistent SRS resource set scenario, this bit may be unavailable for use. In this manner, a reserved bit may be used for this indication.

At 812, RAN node 120 may determine whether a list of CCs including the CC are to be updated based on the updated spatial relation. Updating this list may result in less messaging overhead. In some aspects, however, the time domain patterns for the elements of the SRS resource set are the same. At 814, RAN node 120 may determine whether a list of CCs are to be updated. If a list is not to be updated, at 816, RAN node 120 may modify the MAC CE to indicate to include a first bit value in the bit field directing a UE 110 to update a spatial relation of the CC. The MAC CE may also include a value for SP SRS Resource Set ID and Resource ID information for updating the SRS Resource Set at UE 110. RAN node 120 may transmit the MAC CE to the UE 110 at 820.

Returning to 814, if RAN node 120 determines that a list of CCs is to be updated based on the update spatial relation, at 818, RAN node 120 may modify the MAC CE to include a second bit value in the bit field directing a UE 110 to update a spatial relation for CCs in the list of CCs. This list of CCs may have been previously configured by a Radio Resource Control (RRC) message and may correspond to an indicated SRS Resource Set's Cell ID. The MAC CE may also include Resource ID information for updating the SRS Resource Set at UE 110.

Upon receiving the MAC CE, UE 110 may identify the corresponding bit indicating whether a list of CCs is to be updated. Depending on the indicated value, UE 110 may identify the particular CC to update and/or list of CCs to update.

Figure 8C:
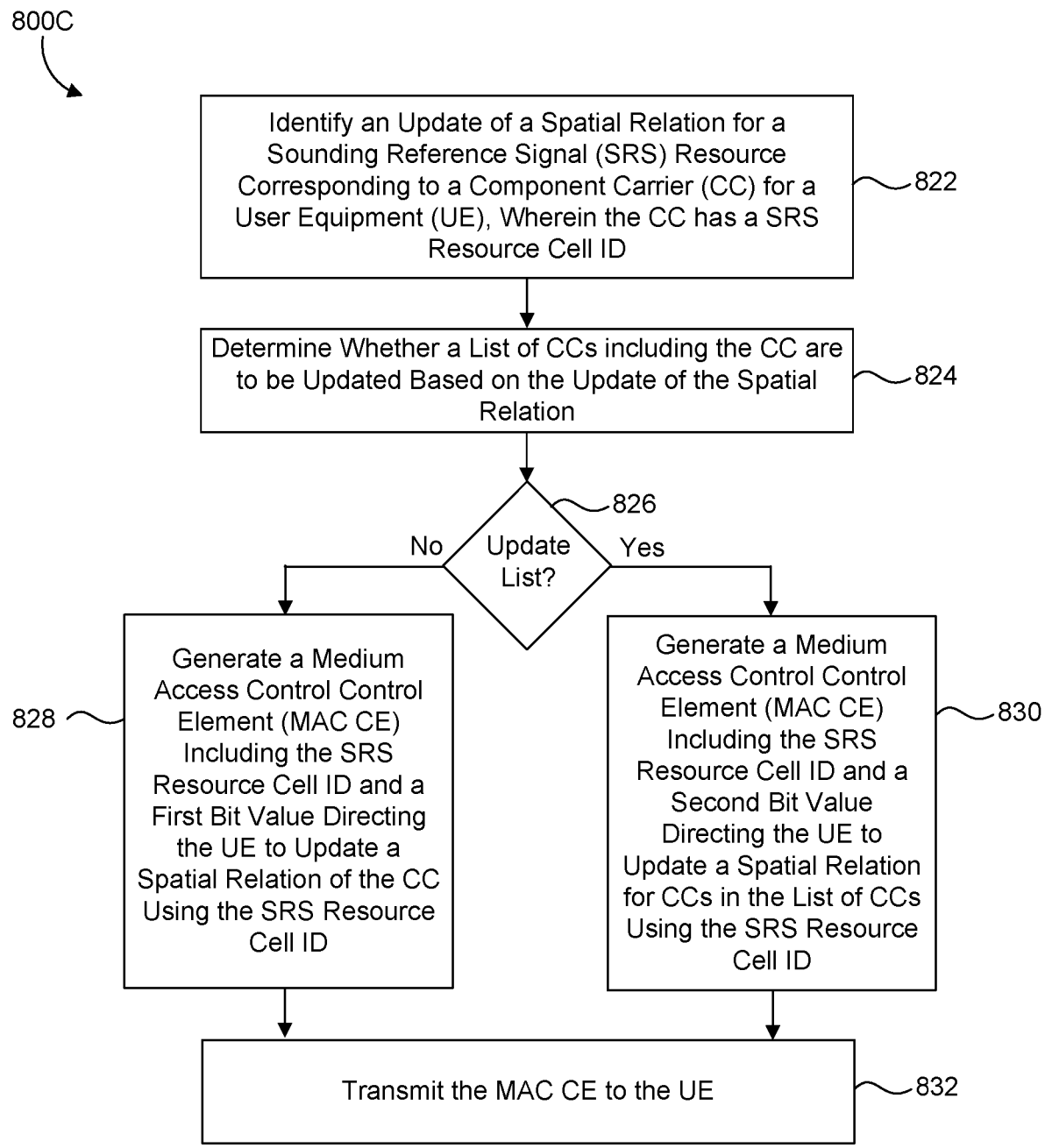
FIG. 8C illustrates a flowchart for generating a MAC CE to update spatial relations for a SRS resource, according to some aspects.

FIG. 8C illustrates a flowchart 800C for generating a MAC CE to update spatial relations for a SRS resource, according to some aspects. In some aspects, a network, such as core network 140, network elements 130, application server 150, a node 120, and/or wireless system 200 may execute flowchart 800C. In some aspects, a RAN node 120 may generate and transmit a MAC CE to a UE using flowchart 800C. Flowchart 800C shall be described with reference to a RAN node 120; however, flowchart 800C is not limited to that example aspect. Flowchart 800C may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 8C, as will be understood by a person of ordinary skill in the art.

At 822, RAN node 120 may identify an update of a spatial relation for a sounding reference signal (SRS) resource corresponding to a component carrier (CC) for a user equipment (UE) 110, wherein the CC has a SRS Resource Cell ID. This update may be for a particular resource rather than a resource set. In this manner, flowchart 800C may be used to update a particular beam identified using SRS Resource Cell ID as described with reference to FIG. 5.

At 824, RAN node 120 may determine whether a list of CCs including the CC are to be updated based on the update of the spatial relation. This list of CCs may have been previously configured by a Radio Resource Control (RRC) message and may correspond to the indicated SRS Resource ID. The update of the spatial relation information may be applicable to other CCs in a list which also includes the CC corresponding to the SRS Resource ID.

At 826, RAN node 120 may determine whether a list of CCs is to be updated at the UE 110. If a list of CCs is not to be updated and the RAN node 120 intends to update the CC corresponding to the SRS Resource Cell ID, RAN node 120 may generate a medium access control control element (MAC CE) at 828. This MAC CE may include the SRS Resource Cell ID and a first bit value directing the UE 110 to update a spatial relation of the CC using the SRS Resource Cell ID. Other values such as a SRS Resource BWP ID and/or SRS Resource ID may also aid in identifying the SRS resource. Values such as resource ID, resource serving cell ID, and/or resource BWP ID may indicate the updated SRS spatial relation. The first bit value may be, for example, a zero value. The MAC CE may be similar to MAC CE 500 as described with reference to FIG. 5. RAN node 120 may then transmit the MAC CE to the UE 110 at 832. UE 110 may then update the CC corresponding to the SRS Resource Cell ID using the Resource ID included in the MAC CE.

Returning to 826, RAN node 120 may determine that a list of CCs is to be updated. In this case, RAN node 120 may generate a MAC CE including the SRS Resource Cell ID and a second bit value directing the UE 110 to update a spatial relation for CCs in the list of CCs using the SRS Resource Cell ID. In this manner, the UE 110 may update the CC corresponding to the SRS Resource Cell ID as well as the other CCs on the list configured by the RRC message. This MAC CE may then provide spatial relation updating for multiple CCs, which may reduce messaging overhead. At 832, RAN node 120 may transmit the MAC CE to the UE 110.

In some aspects, flowcharts 800A, 800B, and/or 800C may be performed over one or more iterations depending on changes to SRS resource sets or resources. For example, an SRS resource set may be updated using a first MAC CE but then at a later time may be updated again with a second MAC CE. Similarly, a second MAC CE may correspond to an update for a particular resource of a resource set. In this manner, the aspects described with respect to flowcharts 800A, 800B, and/or 800C are not limited to a single MAC CE.

Figure 9:
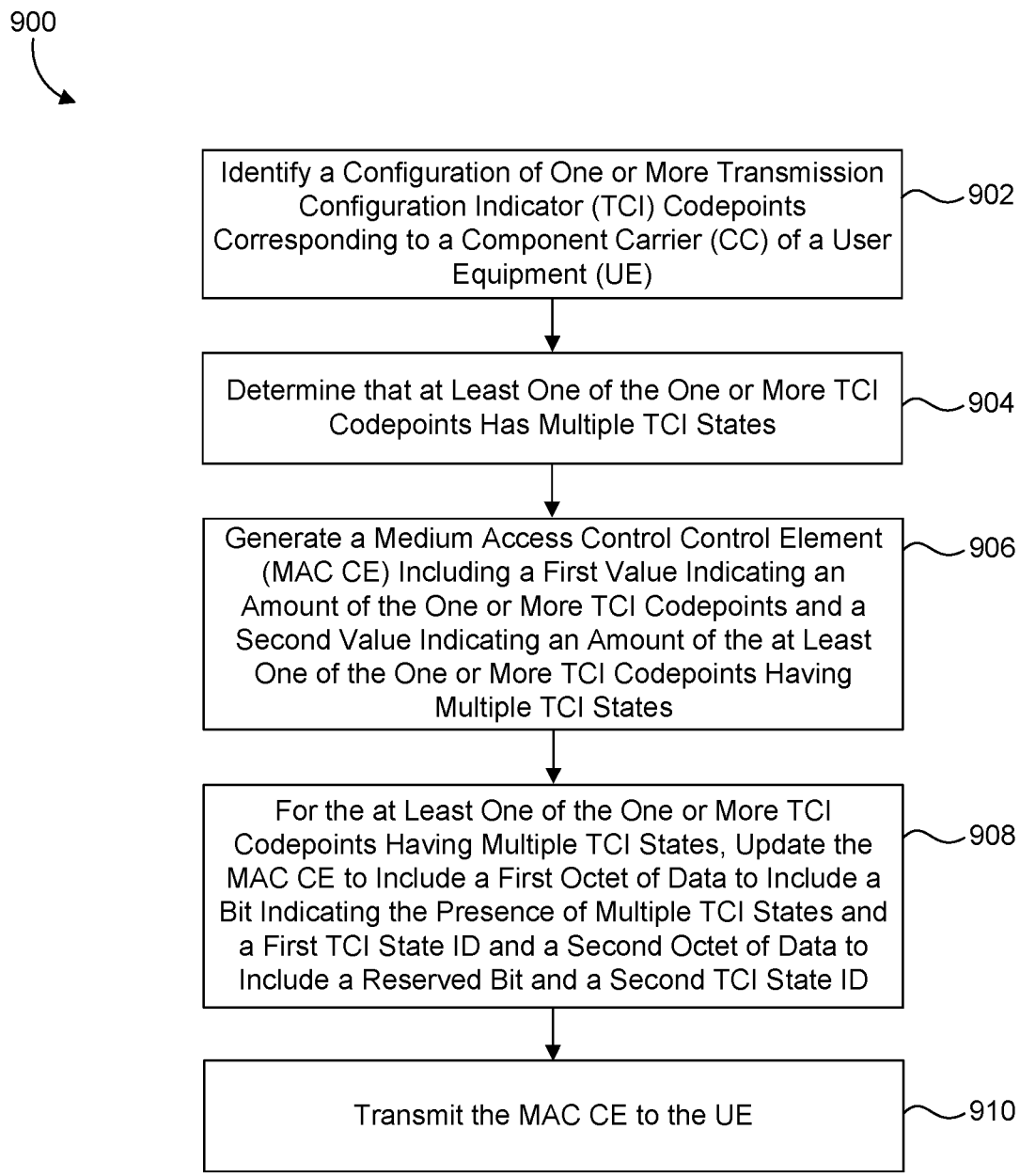
FIG. 9 illustrates a flowchart for configuring TCI codepoints for a PDSCH to support multi-Transmission Reception Point (multi-TRP) operation, according to some aspects.

FIG. 9 illustrates a flowchart 900 for configuring TCI codepoints for a PDSCH to support multi-Transmission Reception Point (multi-TRP) operation, according to some aspects. In some aspects, a network, such as core network 140, network elements 130, application server 150, a node 120, and/or wireless system 200 may execute flowchart 700. In some aspects, a RAN node 120 may generate and transmit a MAC CE to a UE using flowchart 900. Flowchart 900 shall be described with reference to a RAN node 120; however, flowchart 900 is not limited to that example aspect. Flowchart 900 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 9, as will be understood by a person of ordinary skill in the art.

At 902, RAN node 120 may identify a configuration of one or more transmission configuration indicator (TCI) codepoints corresponding to a component carrier (CC). This identification may indicate that a multi-TRP scenario may exist. RAN node 120 may generate a MAC CE that configures a TCI codepoint for a PDSCH.

At 904, RAN node 120 may determine that at least one of the one or more TCI codepoints has multiple TCI states. For example, a TCI codepoint may have two TCI states. In this case, a codepoint may be communicating with multiple TRPs. Other codepoints, however, may still have one TCI state.

At 906, RAN node 120 may generate a MAC CE including a first value indicating an amount of the one or more TCI codepoints and a second value indicating an amount of the at least one of the one or more TCI codepoints having multiple TCI states. This MAC CE may be similar to MAC CE 600A and/or 600B as described with reference to FIG. 6A and FIG. 6B. The first value and the second value may indicate to a UE 110 the number of bits and/or octets to expect in the remaining bits of the MAC CE.

At 908, RAN node 120 may, for the at least one of the one or more TCI codepoints having multiple TCI states, update the MAC CE to include a first octet of data to include a bit indicating the presence of multiple TCI states and a first TCI state ID and a second octet of data to include a reserved bit and a second TCI state ID. In this manner, the MAC CE may use two octets for two TCI state IDs. In some aspects, a bit in the first octet may indicate that the particular codepoint has two TCI states. When UE 110 receives the MAC CE and identifies this bit, UE 110 may recognize that the following octet represents data for the second TCI state corresponding to the codepoint. At 910, RAN node 120 may transmit the MAC CE to UE 110.

In some aspects, flowchart 900 may be performed over one or more iterations depending on changes to TCI states. For example, a TCI state may be updated using a first MAC CE but then at a later time may be updated again with a second MAC CE. Similarly, a second MAC CE may correspond to an update for the same TCI state or a different TCI state. In this manner, the aspects described with respect to flowchart 700 are not limited to a single MAC CE.

Figure 10:
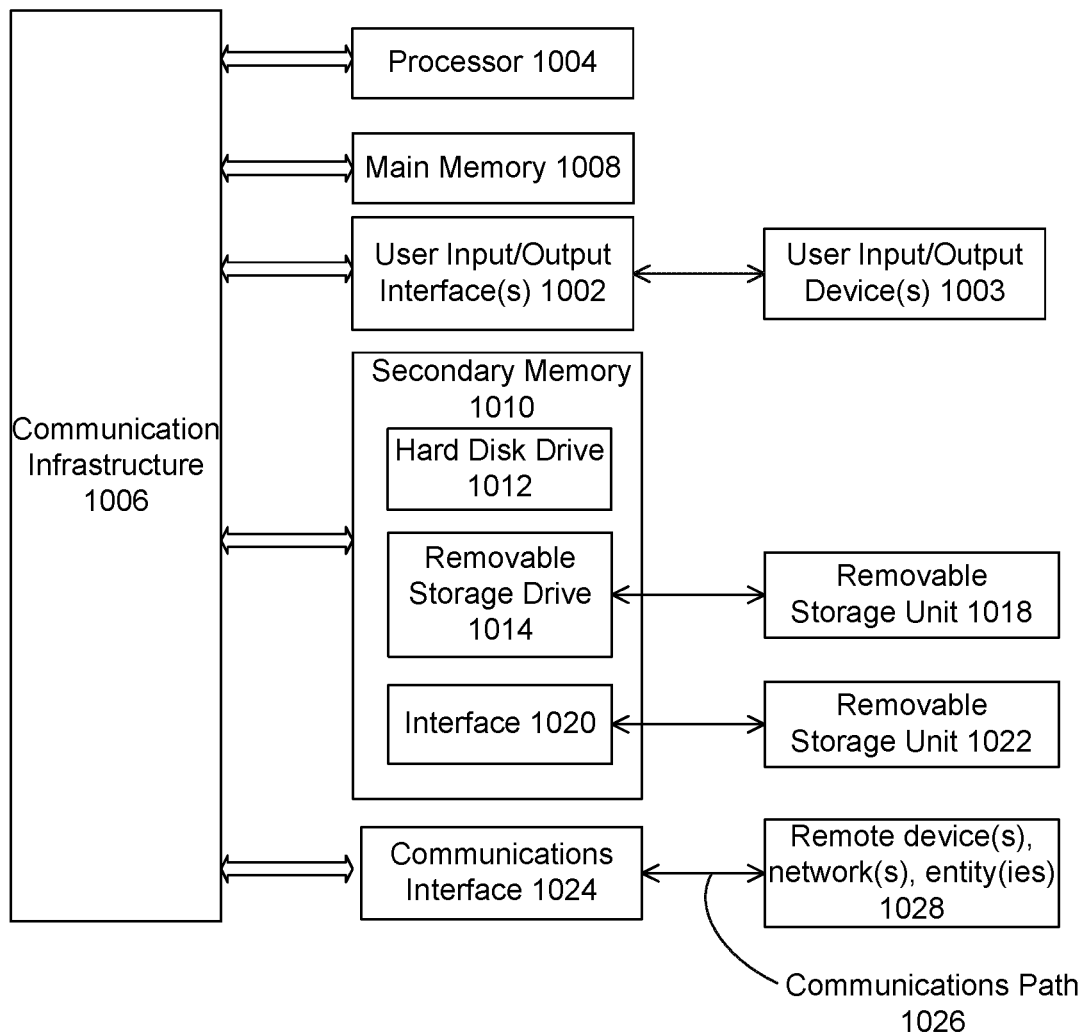
FIG. 10 depicts an example computer system useful for implementing various aspects.

FIG. 10 depicts an example computer system useful for implementing various aspects. Various aspects may be implemented, for example, using one or more well-known computer systems, such as computer system 1000 shown in FIG. 10. One or more computer systems 1000 may be used, for example, to implement any of the aspects discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 10. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspectt," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

What is claimed is:

1. A method, at an access node, comprising:
identifying an update of a Transmission Configuration Indicator (TCI) state corresponding to a Component Carrier (CC) for a User Equipment (UE), wherein the CC has a serving cell ID;
determining that a list of CCs including the CC are to be updated based on the update of the TCI state;
generating a medium access control control element (MAC CE) including the serving cell ID and a bit value directing the UE to update the TCI state for CCs in the list of CCs using the serving cell ID; and
transmitting the MAC CE to the UE,
wherein the bit value modifies a TCI codepoint with multiple TCI states.

2. The method of claim 1, further comprising:
transmitting a Radio Resource Control (RRC) message to the UE to configure the list of CCs.

3. The method of claim 1, wherein the bit value is indicated using a reserved bit of the MAC CE.

4. The method of claim 1, wherein the MAC CE includes TCI state information to update a TCI state for a Physical Downlink Shared Channel (PDSCH).

5. The method of claim 1, wherein the MAC CE includes CORESET information to update a TCI state for a Physical Downlink Control Channel (PDCCH).

6. The method of claim 1, wherein the bit value is indicated using a most significant bit (MSB) or a least significant bit (LSB) of a TCI State ID.

7. An access node, comprising:
a processor configured to:
identify a configuration of one or more Transmission Configuration Indicator (TCI) codepoints corresponding to a Component Carrier (CC) of a User Equipment (UE);
determine that at least one of the one or more TCI codepoints has multiple TCI states;
generate a medium access control control element (MAC CE) including a first value indicating an amount of the one or more TCI codepoints and a second value indicating an amount of the at least one of the one or more TCI codepoints having multiple TCI states; and
for the at least one of the one or more TCI codepoints having multiple TCI states, update the MAC CE to include a bit value indicating a presence of multiple TCI states; and radio front end circuitry, coupled to the processor, transmit the MAC CE to the UE.

8. The access node of claim 7, wherein the processor is further configured to:
transmit a Radio Resource Control (RRC) message to the UE to configure a list of CCs.

9. The access node of claim 7, wherein the bit value is indicated using a reserved bit of the MAC CE.

10. The access node of claim 7, wherein the MAC CE includes TCI state information to update a TCI state for a Physical Downlink Shared Channel (PDSCH).

11. The access node of claim 7, wherein the MAC CE includes CORESET information to update a TCI state for a Physical Downlink Control Channel (PDCCH).

12. The access node of claim 7, wherein the bit value is indicated using a most significant bit (MSB) or a least significant bit (LSB) of a TCI State ID.

13. The access node of claim 7, wherein the bit value modifies a TCI codepoint with multiple TCI states.

14. A non-transitory computer readable medium having instructions stored thereon that, when executed by one or more processors of an access node, causes the access node to perform operations comprising:
identifying an update of a Transmission Configuration Indicator (TCI) state corresponding to a Component Carrier (CC) for a User Equipment (UE), wherein the CC has a serving cell ID;
determining that a list of CCs including the CC are to be updated based on the update of the TCI state;
generating a medium access control control element (MAC CE) including the serving cell ID and a bit value directing the UE to update a TCI state for CCs in the list of CCs using the serving cell ID; and
transmitting the MAC CE to the UE,
wherein the bit value modifies a TCI codepoint with multiple TCI states.

15. The non-transitory computer readable medium of claim 14, wherein the operations further comprise:
transmitting a Radio Resource Control (RRC) message to the UE to configure the list of CCs.

16. The non-transitory computer readable medium of claim 14, wherein the bit value is indicated using a most significant bit (MSB) or a least significant bit (LSB) of a TCI State ID.

17. The non-transitory computer readable medium of claim 14, wherein the bit value is indicated using a reserved bit of the MAC CE.

18. The non-transitory computer readable medium of claim 14, wherein the MAC CE includes TCI state information to update a TCI state for a Physical Downlink Shared Channel (PDSCH).

19. The non-transitory computer readable medium of claim 14, wherein the MAC CE includes CORESET information to update a TCI state for a Physical Downlink Control Channel (PDCCH).

* * * * *